(12) United States Patent
Molnar, Jr. et al.

(10) Patent No.: US 12,286,936 B1
(45) Date of Patent: *Apr. 29, 2025

(54) ADJUSTABLE FAN TRACK LINER WITH GROOVE ARRAY ACTIVE FAN TIP TREATMENT FOR DISTORTION TOLERANCE

(71) Applicants: Rolls-Royce North American Technologies Inc., Indianapolis, IN (US); Rolls-Royce Corporation, Indianapolis, IN (US)

(72) Inventors: Daniel E. Molnar, Jr., Indianapolis, IN (US); Robert W. Heeter, Indianapolis, IN (US); Jonathan M. Rivers, Indianapolis, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/660,069

(22) Filed: May 9, 2024

(51) Int. Cl.
| | | |
|---|---|---|
| F04D 29/68 | (2006.01) | |
| F01D 17/12 | (2006.01) | |
| F02C 9/16 | (2006.01) | |
| F01D 11/08 | (2006.01) | |
| F01D 11/22 | (2006.01) | |
| F04D 29/52 | (2006.01) | |

(52) U.S. Cl.
CPC .............. *F02C 9/16* (2013.01); *F01D 17/12* (2013.01); *F01D 11/08* (2013.01); *F01D 11/22* (2013.01); *F04D 29/526* (2013.01); *F04D 29/685* (2013.01); *F05D 2220/32* (2013.01); *F05D 2240/12* (2013.01); *F05D 2240/14* (2013.01); *F05D 2260/60* (2013.01); *F05D 2270/101* (2013.01)

(58) Field of Classification Search
CPC ...... F04D 29/685; F04D 29/526; F01D 11/08; F01D 11/22
See application file for complete search history.

(56) References Cited

U.S. PATENT DOCUMENTS

| | | | |
|---|---|---|---|
| 4,086,022 | A | 4/1978 | Freeman et al. |
| 4,155,680 | A | 5/1979 | Linko, III et al. |
| 4,239,452 | A | 12/1980 | Frank, Jr. |
| 5,137,419 | A | 8/1992 | Waterman |
| 5,308,225 | A | 5/1994 | Koff et al. |
| 5,474,417 | A | 12/1995 | Privett et al. |
| 5,762,470 | A | 6/1998 | Gelmedov et al. |

(Continued)

FOREIGN PATENT DOCUMENTS

| | | |
|---|---|---|
| CN | 201152282 Y | 11/2008 |
| CN | 104373388 B | 1/2017 |

(Continued)

*Primary Examiner* — Woody A Lee, Jr.
*Assistant Examiner* — Behnoush Haghighian
(74) *Attorney, Agent, or Firm* — Barnes & Thornburg

(57) ABSTRACT

A gas turbine engine includes a fan and a fan case assembly. The fan includes a fan rotor configured to rotate about an axis of the gas turbine engine and a plurality of fan blades coupled to the fan rotor for rotation therewith. The fan case assembly extends circumferentially around the plurality of fan blades radially outward of the plurality of the fan blades.

20 Claims, 16 Drawing Sheets

(56) References Cited

U.S. PATENT DOCUMENTS

| | | |
|---|---|---|
| 6,231,301 B1 | 5/2001 | Barnett et al. |
| 6,406,470 B1 | 6/2002 | Kierce |
| 6,497,551 B1 | 12/2002 | Hand et al. |
| 6,514,039 B1 | 2/2003 | Hand |
| 6,619,909 B2 | 9/2003 | Barnett et al. |
| 6,648,591 B2 | 11/2003 | Collins |
| 6,685,426 B2 | 2/2004 | Clark |
| 6,736,594 B2* | 5/2004 | Irie .................. F04D 29/547 |
| | | 415/173.1 |
| 6,742,983 B2 | 6/2004 | Schmuecker |
| 6,832,890 B2 | 12/2004 | Booth |
| 6,905,305 B2 | 6/2005 | James |
| 6,935,833 B2 | 8/2005 | Seitz |
| 7,077,623 B2 | 7/2006 | Guemmer |
| 7,186,072 B2 | 3/2007 | Seitz |
| 7,210,905 B2 | 5/2007 | Lapworth |
| 7,575,412 B2 | 8/2009 | Seitz |
| 7,967,556 B2 | 6/2011 | Volker |
| 8,043,046 B2 | 10/2011 | Guemmer |
| 8,152,444 B2 | 4/2012 | Guemmer |
| 8,152,445 B2 | 4/2012 | Guemmer |
| 8,152,467 B2 | 4/2012 | Guemmer |
| 8,182,209 B2 | 5/2012 | Brault et al. |
| 8,192,148 B2 | 6/2012 | Guemmer |
| 8,257,022 B2 | 9/2012 | Guemmer |
| 8,262,340 B2 | 9/2012 | Guemmer |
| 8,337,146 B2 | 12/2012 | Yu |
| 8,403,630 B2 | 3/2013 | Guemmer |
| 8,419,355 B2 | 4/2013 | Guemmer et al. |
| 8,602,720 B2 | 12/2013 | Goswami et al. |
| 8,845,269 B2 | 9/2014 | Agneray et al. |
| 8,915,699 B2 | 12/2014 | Brignole et al. |
| 9,638,213 B2 | 5/2017 | Obrecht et al. |
| 9,651,060 B2 | 5/2017 | Morel et al. |
| 9,816,528 B2 | 11/2017 | Johann |
| 9,957,976 B2 | 5/2018 | Allford |
| 10,024,336 B2 | 7/2018 | Obrecht et al. |
| 10,047,620 B2 | 8/2018 | Giacché et al. |
| 10,066,640 B2 | 9/2018 | Bennington et al. |
| 10,378,550 B2* | 8/2019 | Lim .................. F04D 29/685 |
| 10,450,869 B2 | 10/2019 | Brignole et al. |
| 10,539,154 B2 | 1/2020 | Mallina et al. |
| 10,914,318 B2 | 2/2021 | Capozzi et al. |
| 11,078,805 B2 | 8/2021 | Joly et al. |
| 11,092,030 B2* | 8/2021 | Joly .................. F04D 29/685 |
| 11,131,322 B2 | 9/2021 | Grothe et al. |
| 11,473,438 B2 | 10/2022 | Reynolds et al. |
| 11,572,897 B1* | 2/2023 | Duong ................ F04D 27/0246 |
| 11,686,207 B2 | 6/2023 | Brignole et al. |
| 11,702,945 B2 | 7/2023 | Heeter et al. |
| 11,732,612 B2 | 8/2023 | Molnar, Jr. et al. |
| 2003/0002982 A1* | 1/2003 | Irie .................... F04D 15/0027 |
| | | 415/220 |
| 2005/0226717 A1 | 10/2005 | Xu |
| 2007/0147989 A1 | 6/2007 | Collins |
| 2008/0044273 A1 | 2/2008 | Khalid |
| 2009/0065064 A1 | 3/2009 | Morris et al. |
| 2010/0310353 A1 | 12/2010 | Yu |
| 2012/0269619 A1 | 10/2012 | Johann |
| 2012/0315131 A1* | 12/2012 | Mertens ............. F04D 27/0215 |
| | | 415/126 |
| 2014/0119883 A1 | 5/2014 | Kempf |
| 2015/0086344 A1 | 3/2015 | Guemmer |
| 2016/0010652 A1* | 1/2016 | Lim ...................... F04D 27/002 |
| | | 415/128 |
| 2016/0230776 A1 | 8/2016 | Bennington et al. |
| 2018/0163562 A1 | 6/2018 | Khare et al. |
| 2020/0224675 A1 | 7/2020 | Capozzi et al. |
| 2020/0332673 A1* | 10/2020 | Joly ....................... F01D 9/047 |

FOREIGN PATENT DOCUMENTS

| | | |
|---|---|---|
| CN | 110242616 A | 9/2019 |
| CN | 113217469 A | 8/2021 |
| DE | 60201109 T2 | 10/2004 |
| DE | 102007056953 A1 | 5/2009 |
| DE | 102011007767 A1 | 10/2012 |
| DE | 102013210169 A1 | 12/2014 |
| DE | 102018203304 A1 | 9/2019 |
| EP | 2268926 B1 | 8/2011 |
| EP | 2434164 | 3/2012 |
| EP | 2434164 A1 | 3/2012 |
| EP | 3081779 | 10/2016 |
| EP | 3081779 A1 | 10/2016 |
| EP | 3591237 A1 | 1/2020 |
| EP | 3006679 B1 | 9/2023 |
| FR | 3122450 A1 | 11/2022 |
| GB | 2408546 A | 6/2005 |
| GB | 2477745 A | 8/2011 |
| JP | 2003227497 A | 8/2003 |
| KR | 200930757 A | 3/2009 |
| KR | 1025867 B1 | 3/2011 |
| KR | 1387391 B1 | 4/2014 |
| WO | 2014098276 A1 | 6/2014 |
| WO | 2022229555 A2 | 11/2022 |

* cited by examiner

ADJUSTABLE FAN TRACK LINER WITH GROOVE ARRAY ACTIVE FAN TIP TREATMENT FOR DISTORTION TOLERANCE

STATEMENT REGARDING FEDERALLY SPONSORED RESEARCH OR DEVELOPMENT

Embodiments of the present disclosure were made with government support under Contract No. FA8650-19-D-2063 or FA8650-19-F-2078. The government may have certain rights.

FIELD OF THE DISCLOSURE

The present disclosure relates generally to gas turbine engines, and more specifically to fan assemblies for gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

In embedded gas turbine engine applications, the engine may experience high distortion in the form of pressure gradients and swirl. The pressure and swirl distortions may cause engine stall or other undesirable aeromechanical behavior. The fan of the gas turbine engine may include mitigation systems to reduce or minimize the negative effects of pressure and swirl distortions to improve stall margin of the engine.

SUMMARY

The present disclosure may comprise one or more of the following features and combinations thereof.

A fan case assembly may be adapted for use with a gas turbine engine. The fan case assembly may include a case, a plurality of drums, and a control unit.

In some embodiments, the case may extend circumferentially at least partway about a central axis of the fan case assembly. The case may define an outer boundary of a gas path of the gas turbine engine. The case may be formed to define a channel that extends circumferentially at least partway about the central axis.

In some embodiments, the plurality of drums may be arranged in the channel and spaced circumferentially about the central axis. Each drum of the plurality of drums may be shaped to include at least one groove that extends partway into the drum. Each drum of the plurality of drums may be configured to rotate about a respective drum axis between a closed position and an open position.

In some embodiments, in the closed position, the groove of the corresponding drum may face away from the gas path so that an outer surface of the corresponding drum cooperates with an inner surface of the case to define the outer boundary of the gas path. In the open position, at least one groove of the corresponding drum may face towards the gas path so that the at least one groove of the corresponding drum is open to the gas path to allow air to flow into the at least one groove from the gas path.

In some embodiments, the control unit may be configured to rotate the plurality of drums about the respective drum axis between the closed position and the open position. In some embodiments, the control unit may be configured to rotate the plurality of drums about the respective drum axis between the closed position and the open position in response to preselected operating conditions to minimize negative effects pressure and swirl distortions in the gas turbine engine to improve stall margin.

In some embodiments, the plurality of drums may include a first set of drums and a second set of drums. The control unit may be configured to rotate the first set of drums between the closed position and the open position independent of the second set of drums. In some embodiments, the first set of drums may be alternated circumferentially between the second set of drums.

In some embodiments, the groove on each respective drum of the first set of drums may have a first depth. The groove on each respective drum of the second set of drums may have a second depth. The first depth may be greater than the second depth.

In some embodiments, each drum of the plurality of drums may be shaped to include a first groove that extends partway into the respective drum. In some embodiments, each drum of the plurality of drums may be shaped to include a second groove that extends partway into the respective drum opposite the first groove. Each drum of the plurality of drums may be configured to rotate about the respective drum axis between the closed position, a first open position, and a second open position.

In some embodiments, in the closed position, the first groove and the second groove of the corresponding drum may each face away from the gas path so that the outer surface of the corresponding drum cooperates with the inner surface of the case to define the outer boundary of the gas path. In the first open position, the first groove of the corresponding drum may face radially inward towards the gas path and open to the gas path. In the first open position, the second groove may face radially outward away from the gas path. In the second open position, the second groove of the corresponding drum may face radially inward towards the gas path and opens to the gas path while the first groove may face radially outward away from the gas path.

In some embodiments, the depth of the first groove may be greater than a depth of the second groove. In some embodiments, each drum of the plurality of drums may have a cylindrical shape that defines a first end, a second end spaced apart axially from the first end, and the outer surface that extends axially between the first end and the second end and circumferentially about the corresponding drum axis.

In some embodiments, the control unit may include at least one actuator and a controller. The actuator may be coupled to the plurality of drums. The actuator may be configured to drive rotation of the plurality of drums between the closed position and the open position. The controller may be coupled to the at least one actuator and configured to direct the at least one actuator to move the plurality of drums to the closed position when the gas turbine engine is in a cruise condition included in the preselected operating conditions.

In some embodiments, the control unit may further include a memory coupled to the controller. The memory may include a plurality of preprogrammed aircraft maneuvers that each correspond to one of the closed position and the open position. The controller may be configured to detect a preprogrammed aircraft maneuver included in the plurality of preprogrammed aircraft maneuvers on the memory. The controller may be configured to direct the at least one actuator to move the plurality of drums to a corresponding position in response to detecting the preprogrammed aircraft maneuver.

In some embodiments, the control unit may further includes at least one sensor coupled to the controller. The sensor may be configured to measure one of pressure, air speed, altitude, blade tip timing, blade rotational speed, attitude, and acceleration. The controller may be configured to receive a measurement from the at least one sensor and direct the at least one actuator to move the plurality of drums to a corresponding position in response to the measurement of the at least one sensor.

According to another aspect of the present disclosure, the gas turbine engine may include a fan and a fan case assembly. The fan may include a fan rotor and a plurality of fan blades. The fan rotor may be configured to rotate about an axis of the gas turbine engine. The plurality of fan blades may be coupled to the fan rotor for rotation therewith. In some embodiments, the fan case assembly may be adapted for use with a gas turbine engine.

In some embodiments, the fan case that may extend circumferentially at least partway about a central axis of the fan case assembly to define an outer boundary of a gas path of the gas turbine engine. The case may be formed to define a channel that extends circumferentially at least partway about the central axis.

In some embodiments, the plurality of drums may be arranged in the channel. Each drum of the plurality of drums may be shaped to include at least one groove that extends partway into the drum. Each drum of the plurality of drums may be configured to rotate about a respective drum axis between a closed position and an open position.

In some embodiments, in the closed position, the groove of the corresponding drum may face away from the gas path. In the open position the groove of the corresponding drum may face towards the gas path so that the at least one groove is open to the gas path.

In some embodiments, the control unit is configured to rotate the plurality of drums about the respective drum axis between the closed position and the open position. In some embodiments, the control unit is configured to rotate the plurality of drums about the respective drum axis between the closed position and the open position in response to preselected operating conditions.

In some embodiments, each of the plurality of fan blades may include a leading edge and a trailing edge. The plurality of drums may be located closer to one of the leading edge and the trailing edge of the plurality of fan blades.

In some embodiments each drum of the plurality of drums may have a cylindrical shape that defines a first end, a second end spaced apart axially from the first end, and an outer surface that extends axially between the first end and the second end and circumferentially about the corresponding drum axis. The outer surface of each drum of the plurality of drums may cooperate with an inner surface of the gas path to define a portion of the outer boundary of the gas path when each drum of the plurality of drums is in the closed position.

In some embodiments, the plurality of drums may include a first set of drums and a second set of drums. The control unit may be configured to rotate the first set of drums between the closed position and the open position independent of the second set of drums. In some embodiments, the first set of drums may be alternated circumferentially between the second set of drums.

In some embodiments, the groove on each respective drum of the first set of drums may have a first depth. The groove on each respective drum of the second set of drums may have a second depth. The first depth may be greater than the second depth.

In some embodiments, each drum of the plurality of drums may include a first groove that extends partway into the respective drum. Each drum of the plurality of drums may include a second groove that extends partway into the respective drum opposite the first groove.

In some embodiments, each drum of the plurality of drums may be configured to rotate about the respective drum axis between the closed position, a first open position, and a second open position. In the closed position, the first groove and the second groove of the corresponding drum may each face away from the gas path so that an outer surface of the corresponding drum cooperates with an inner surface of the case to define the outer boundary of the gas path. In the first open position, the first groove of the corresponding drum may face radially inward towards the gas path while the second groove faces radially outward away from the gas path. In the second open position, the second groove of the corresponding drum may face radially inward towards the gas path while the first groove faces radially outward away from the gas path. The depth of the first groove is larger than a depth of the second groove.

In some embodiments, the control unit may include at least one actuator and a controller. The at least one actuator may be coupled to the plurality of drums and configured to drive movement of the plurality of drums between the closed position and the open position. The controller may be coupled to the at least one actuator and configured to direct the at least one actuator to move the plurality of drums to the closed position when the gas turbine engine is in a cruise condition included in the preselected operating conditions.

In some embodiments, the control unit may further include a memory coupled to the controller. The memory may include a plurality of preprogrammed aircraft maneuvers that each correspond to one of the closed position and the open position. The controller may be configured to detect a preprogrammed aircraft maneuver included in the plurality of preprogrammed aircraft maneuvers on the memory and direct the at least one actuator to move the plurality of drums to a corresponding position in response to detecting the preprogrammed aircraft maneuver.

According to another aspect of the present disclosure, a method may include providing a fan case assembly. The fan case assembly may be adapted for use with a gas turbine engine.

In some embodiments, the fan case assembly may include a case and a plurality of drums. The case may extend circumferentially at least partway about a central axis of the gas turbine engine. The case may be formed to define an outer boundary of a gas path of the gas turbine engine. The case may be formed to define a channel that extends circumferentially at least partway about the central axis.

In some embodiments, the plurality of drums may be arranged in the channel. Each one of the plurality of drums may include at least one groove that extends partway into the drum. Each drum of the plurality of drums may be configured to rotate about a respective drum axis.

In some embodiments, the method may include locating the plurality of drums in a closed position. In the closed position, the at least one groove of the corresponding drum may face away from the gas path to cause the outer surface of the corresponding drum to cooperate with an inner surface of the case to define the outer boundary of the gas path.

In some embodiments, the method may include rotating the plurality of drums to an open position. In the open position, the at least one groove the corresponding drum may face toward the gas path so that the at least one groove is open to the gas path to allow air to flow into the at least one groove from the gas path.

These and other features of the present disclosure will become more apparent from the following description of the illustrative embodiments.

DETAILED DESCRIPTION OF THE DRAWINGS

Figure 1:
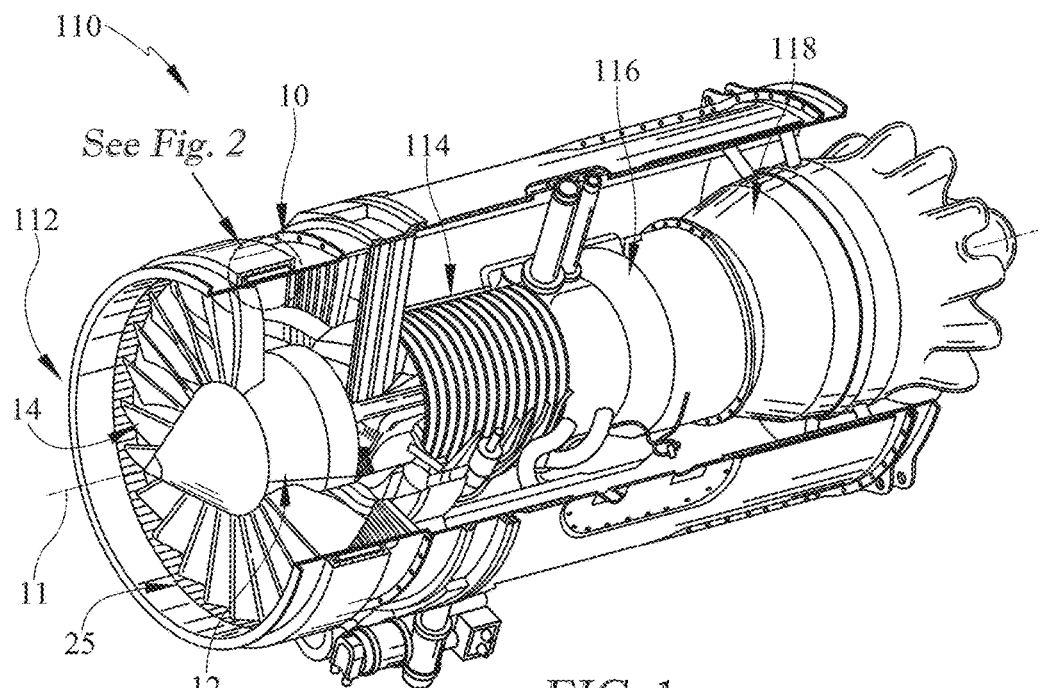
FIG. 1 is a cutaway view of a gas turbine engine that includes a fan, a compressor, a combustor, and a turbine, the fan including fan rotor configured to rotate about an axis of the engine and a fan case assembly that surrounds fan blades included in the fan rotor.

For the purposes of promoting an understanding of the principles of the disclosure, reference will now be made to a number of illustrative embodiments illustrated in the drawings and specific language will be used to describe the same.

A fan case assembly 10 is adapted for use in a gas turbine engine 110 as shown in FIG. 1. The gas turbine engine 110 includes a fan 112, a compressor 114, a combustor 116, and a turbine 118 as shown in FIG. 1. The fan 112 is driven by the turbine 118 and provides thrust for propelling an aircraft. The compressor 114 compresses and delivers air to the combustor 116. The combustor 116 mixes fuel with the compressed air received from the compressor 114 and ignites the fuel. The hot, high pressure products of the combustion reaction in the combustor 116 are directed into the turbine 118 to cause the turbine 118 to rotate about a central axis 11 of the gas turbine engine 110 and drive the compressor 114 and the fan 112.

The fan 112 includes a fan rotor 12 and a fan case assembly 10 as shown in FIG. 1. The fan rotor 12 has a number of fan blades 14. The fan case assembly 10 extends circumferentially around the fan blades 14 of the fan rotor 12 such that the fan case assembly 10 is aligned axially with the fan blades 14.

Figure 2:
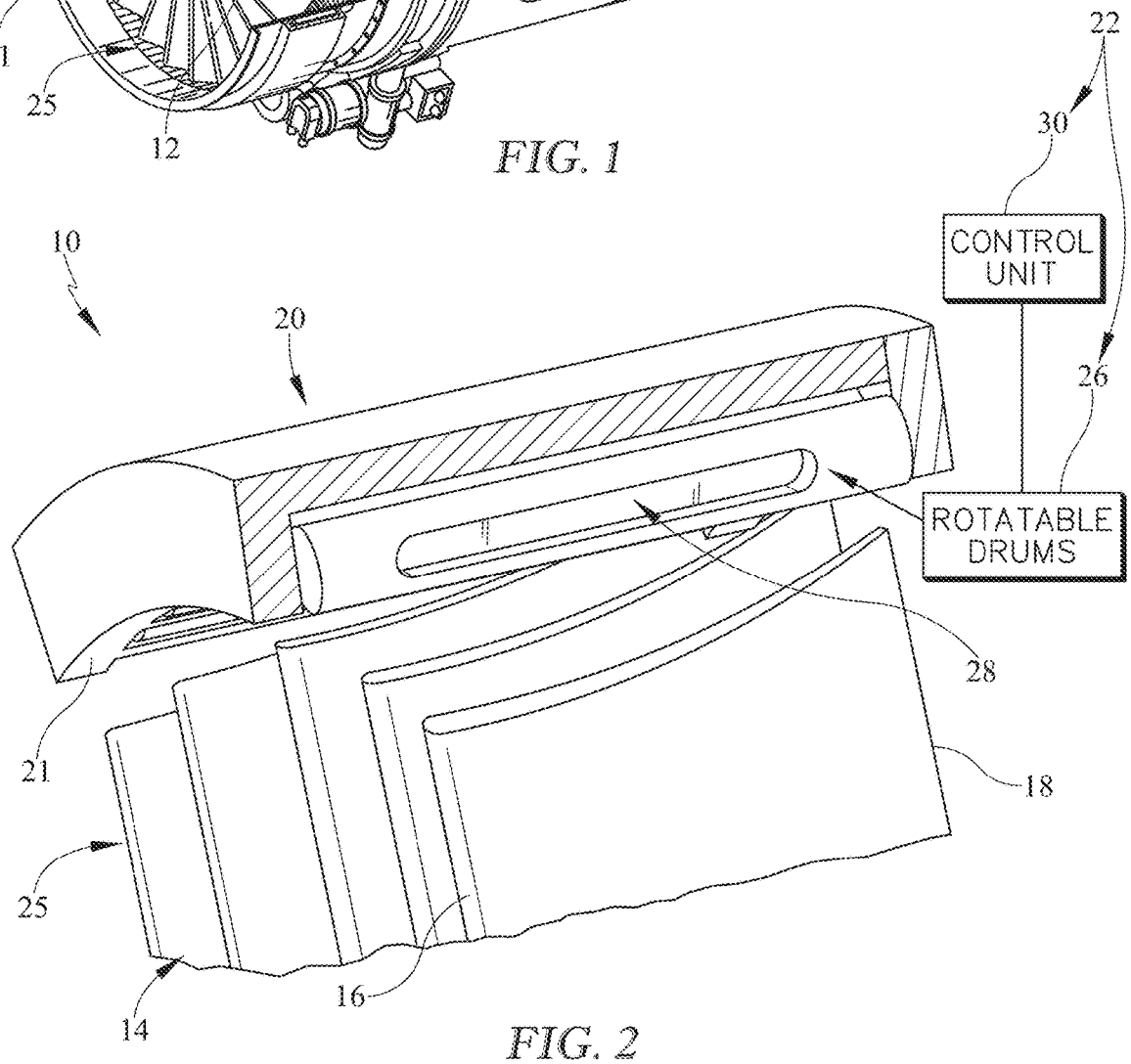
FIG. 2 is a detail view of the fan case assembly included in the gas turbine engine of FIG. 1 showing that the fan case assembly includes a case that extends circumferentially at least partway about a central axis of the engine radially outward of the fan blades to define an outer boundary of a gas path of the gas turbine engine, a plurality of drums arranged in the fan case assembly and configured to rotate about a respective drum axis between a closed position as shown in FIG. 7 or FIG. 26 and an open position as shown in FIG. 8 to form recesses in the outer boundary of the gas path to recirculate air at the tips of the fan blades, and a control unit configured to rotate the plurality of drums between the different positions in response to preselected operating conditions to minimize negative effects of pressure and swirl distortions in the gas turbine engine to improve stall margin.
Figure 3:
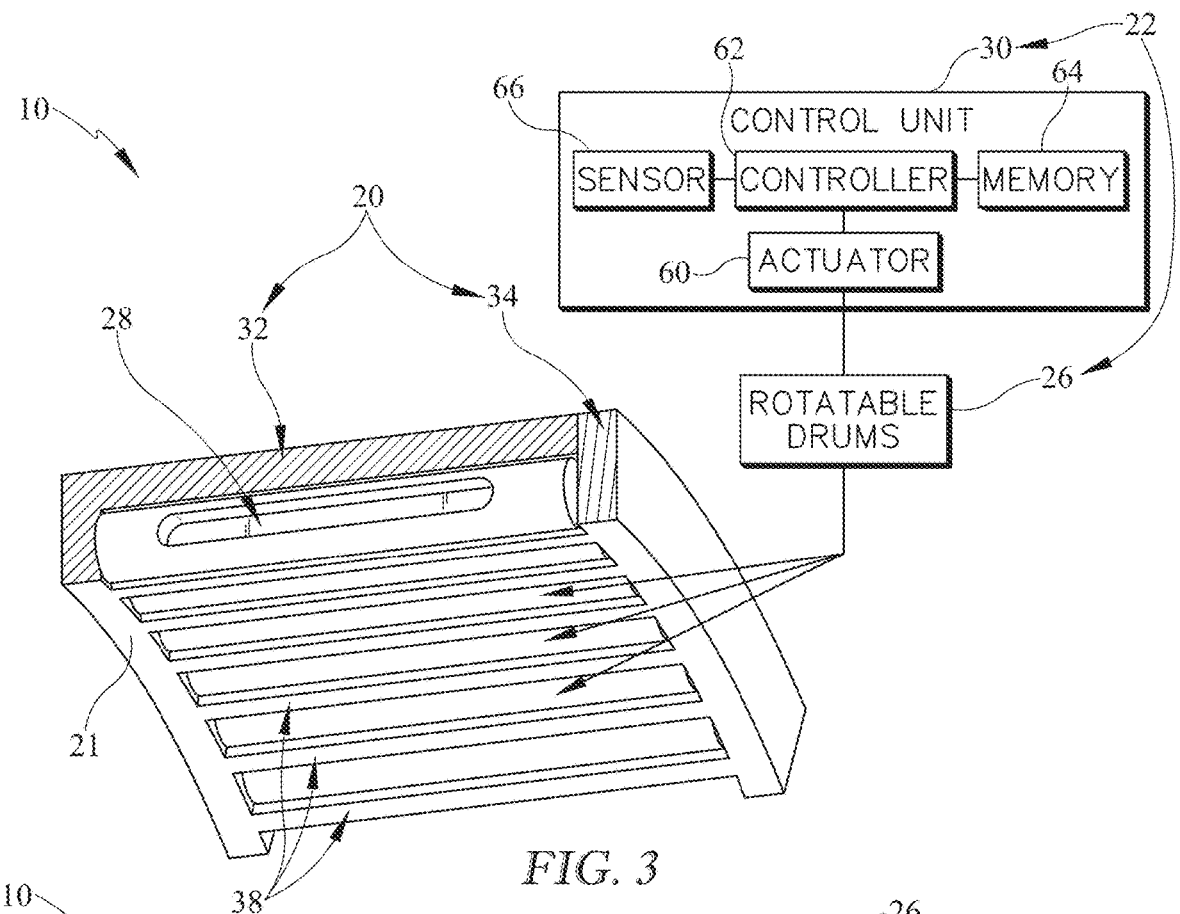
FIG. 3 is a perspective view of the fan case assembly of FIG. 2 showing the plurality of drums are spaced apart circumferentially about the central axis.
Figure 4:
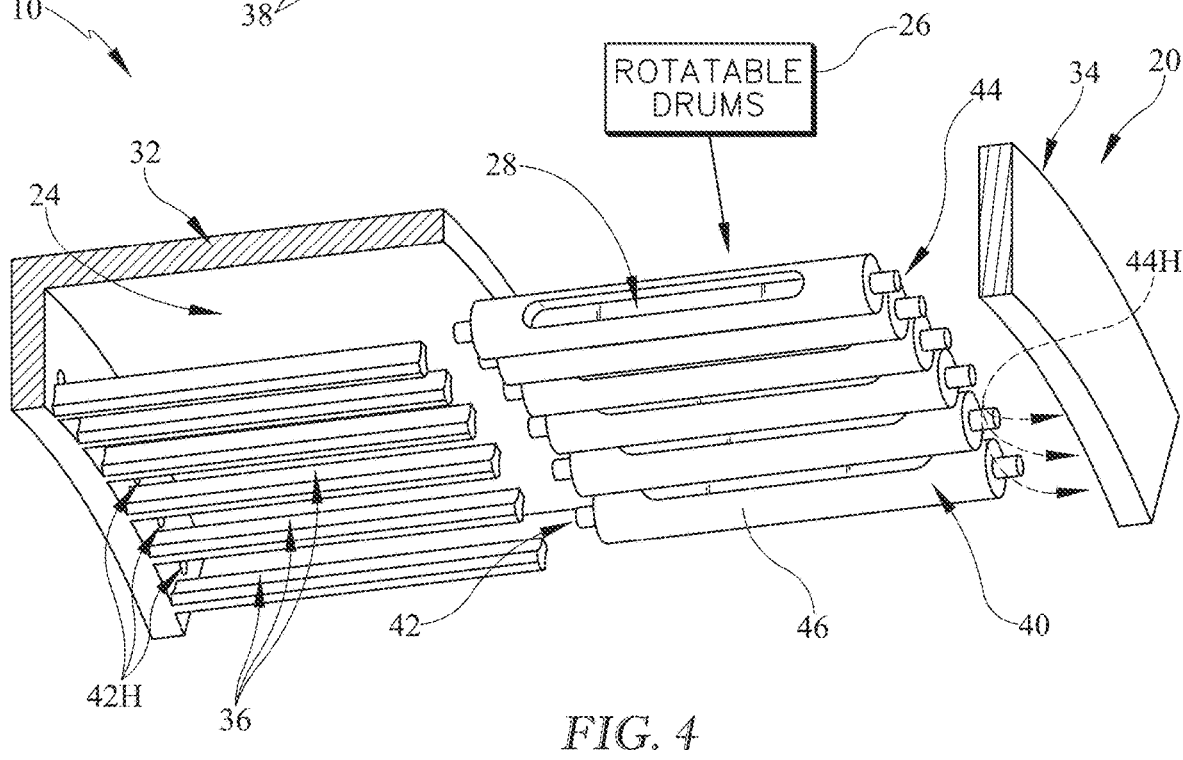
FIG. 4 is an exploded view of FIG. 3 showing the case includes a forward section and an aft section configured to be coupled to the forward section to trap the plurality of drums axially therebetween, and further showing each of the drums includes a drum body that extends axially between opposite axial ends and a pair of pegs that extend axially from the opposite ends of the corresponding drum body to fit into peg holes formed in the forward and aft sections of the case.

The fan case assembly 10 includes, among other components, a case 20 and an inlet distortion mitigation system 22 as shown in FIGS. 2-4. The case 20 extends circumferentially at least partway about the central axis 11 to define an outer boundary of a gas path 25 of the gas turbine engine 110. The inlet distortion mitigation system 22 is configured to control whether tip treatment is applied to the fan blades 14 of the fan 112 by altering the shape and/or surface geometry of an inner surface 21 of the case 20 which defines the outer boundary of the gas path 25 of the gas turbine engine 110.

The inlet distortion mitigation system 22 includes a plurality of rotatable drums 26 arranged in a channel 24 of the case 20 and a control unit 30 as shown in FIGS. 2-4. The plurality of drums 26 are each rotatably coupled to the case 20 to rotate about a drum axis A. Each drum 26 of the plurality of drums 26 includes a groove 28 that extends radially partway into the corresponding drum 26 relative to the drum axis A. The groove 28 extends radially partway into the corresponding drum 26 and axially partway along the drum 26 relative to the drum axis A.

Figure 5:
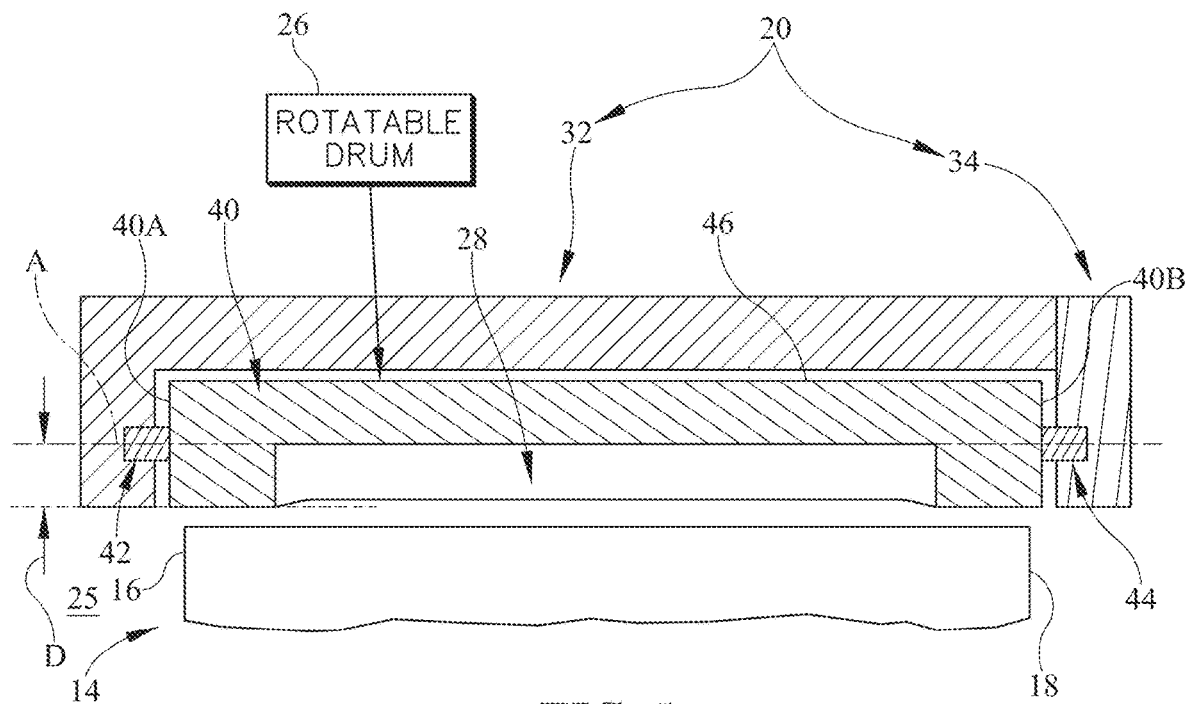
FIG. 5 is a circumferential cross-section view of the fan case assembly of FIG. 3 showing the plurality of drums in the open position in which the groove of the corresponding drum faces radially inward and opens towards the gas path to allow air form the gas path recirculates air at the tips of the fan blades.

The groove 28 extends into the corresponding drum 26 to a certain depth D as shown in FIG. 5. In some embodiments, the depth D the groove 28 may be substantially equal to a radius of the drum 26 such that the groove 28 extends to a midpoint or half of the diameter of the drum 26, as shown in FIG. 5. Alternatively, as described in more detail below, the groove 28 may extend a lesser depth into the drum 26 or may extend a greater depth into the drum 26.

In the illustrative embodiment, the groove 28 extends radially partway into the corresponding drum 26. In some embodiments, the groove 28 may extend radially and circumferentially partway into the corresponding drum 26.

Figure 6:
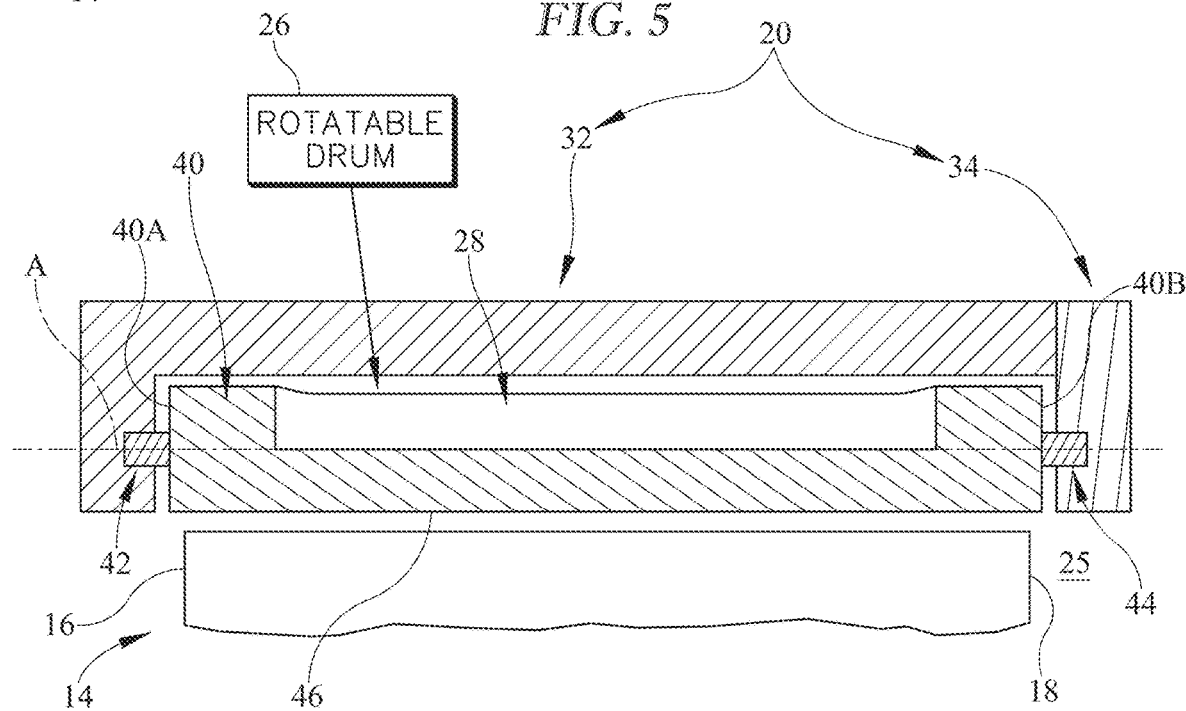
FIG. 6 is a circumferential cross-section view of the fan case assembly of FIG. 3 showing the plurality of drums in the closed position in which the groove of the corresponding drum faces away from the gas path so that the outer surface of the corresponding drum cooperates with the inner surface of the fan case to form a portion of the outer boundary of the gas path to remove the tip treatment.
Figure 7:
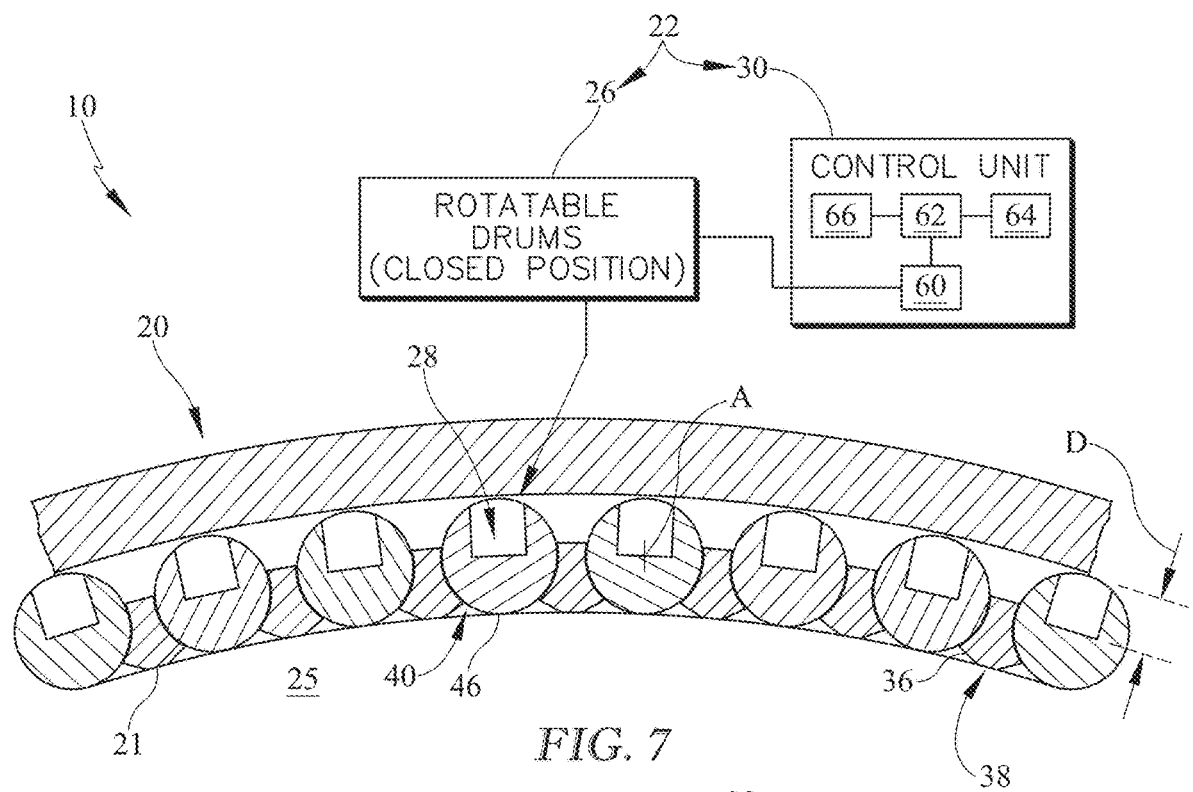
FIG. 7 is an axial cross-section view of the fan case assembly of FIG. 3 showing the plurality of drums in the closed position in which the groove of the corresponding drum faces away from the gas path to close off the groove from the gas path so that the outer surface of the corresponding drum cooperates with the inner surface of the case to define a portion of the outer boundary of the gas path.
Figure 8:
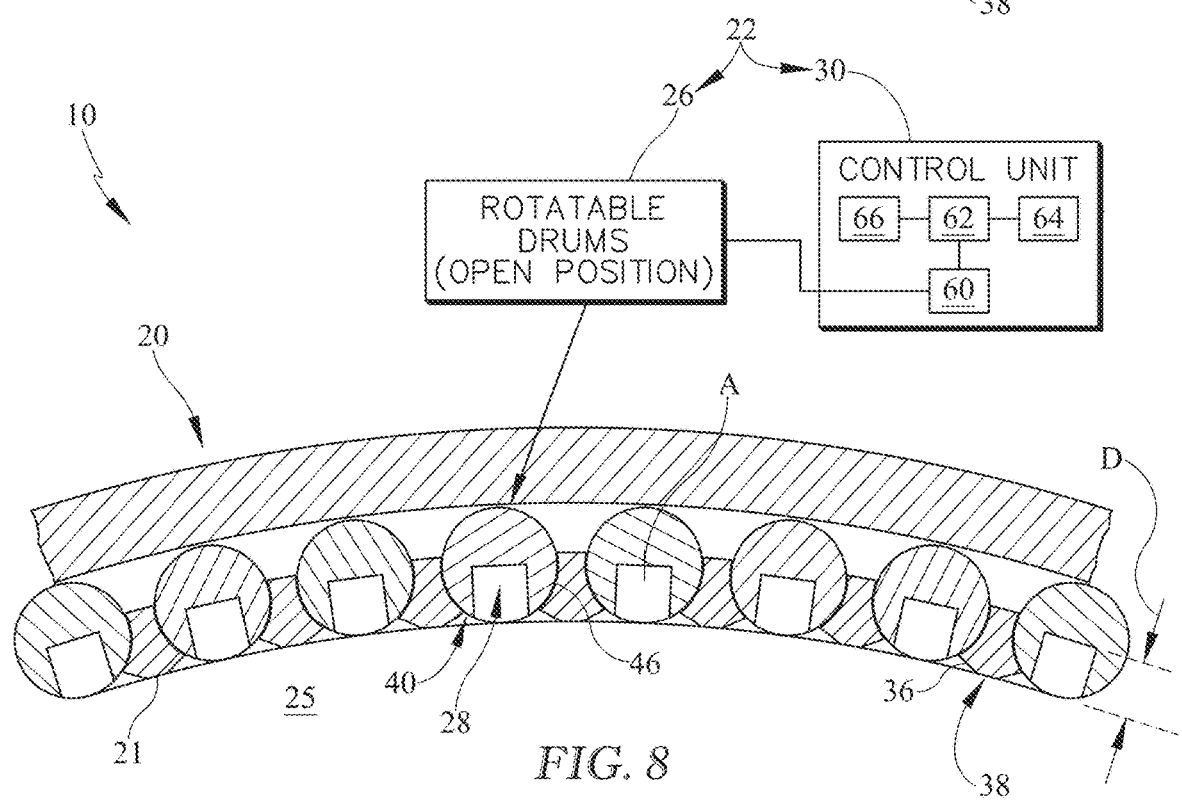
FIG. 8 is an axial cross-section view of the fan case assembly of FIG. 3 showing the plurality of drums in the open position in which the groove of the corresponding drum faces towards the gas path so that the groove is open to the gas path to allow air to flow into the groove from the gas path to provide the tip treatment to the fan blades.

The inlet distortion mitigation system 22 is configured to change between a closed mode as shown in FIGS. 5 and 8 and an open mode as shown in FIGS. 6 and 7. In the closed mode, some or all of the drums 26 are in a closed position so that the corresponding groove 28 or grooves 28 face away from the gas path 25 to prevent fluid communication with the grooves 28 of the corresponding drums 26. In the open mode, some or all of the drums 26 are in an open position so that the corresponding groove 28 or grooves 28 face toward the gas path 25 to open the grooves 28 to the gas path 25 and allow fluid communication therewith. In the closed mode, no tip treatment benefit is provided, while in the open mode, the tip treatment is applied to the fan blades 14.

The plurality of drums 26 are each configured to rotate between closed position as shown in FIGS. 6 and 7 and an open position as shown in FIGS. 5 and 8. Each rotatable drum 26 rotates about the drum axis A to open the groove 28 towards the gas path 25. When the groove 28 faces towards or is open to the gas path 25, air from the gas path 25 is allowed to flow into the groove 28 to recirculate air locally at the tips of the fan blades 14. To remove tip treatment, each of the rotatable drums 26 rotate to close off the groove 28 from the gas path 25 so that the drums 26 cooperate with the inner surface 21 of the case 20 to form the outer boundary of the gas path 25.

The control unit 30 is configured to rotate each of the plurality of drums 26 about the corresponding drum axis A between the different positions in response to preselected operating conditions to control tip treatment of the fan blades 14. The control unit 30 is configured to rotate each of the drums 26 to control whether the grooves 28 in each drum 26 face toward or away from the gas path 25, thereby controlling whether the grooves 28 are in fluid communication with the gas path 25 to recirculate air at the tips of the fan blades 14. The control unit 30 controls the application of the tip treatment to the fan blades 14 so as to minimize the negative effects of pressure and swirl distortions in the gas turbine engine 110 to improve stall margin for the gas turbine engine 110.

Embedded engines on an aircraft may experience high distortion in the form of pressure gradients and swirl. The pressure and swirl distortions may cause engine stall or other undesirable aeromechanical behavior. Additionally, there may be points during a mission or moments with maneuvers where it may be desirable to incorporate a different available stall margin. Attempting to solve the worst stall condition while maintaining performance over all of the cycles or flight conditions may be difficult and result in compromised efficiency or a limited flight envelope. Compensating for distortion to maintain operability margin may further negatively affect efficiency or performance.

Therefore, the fan case assembly 10 includes the inlet distortion mitigation system 22 which includes the plurality of drums 26 that rotate relative to the case 20 to control whether the tip treatment is applied to the fan blades 14 included in the fan 112 . . . . In this way, the negative effects of pressure and swirl distortions are minimized to improve stall margin. The negative effects may include loss of efficiency or overall performance of the engine 110 and/or other negative operating conditions known to one of ordinary skill in the art.

In the closed position, the groove 28 of each corresponding closed drum 26 faces away from the gas path 25 so that the outer surface 46 of each drum 26 cooperates with the inner surface 21 of the case 20 to define the outer boundary of the gas path 25 as shown in FIGS. 6 and 7. The outer surface 46 of each drum 26 forms a part of the outer boundary of the gas path 25 to form a uniform/consistent inner surface 21 or outer boundary of the gas path 25, i.e. no recesses or discontinuities are formed in the outer boundary of the gas path 25 such that tip treatment is removed. Fluid communication between the gas path 25 and the groove 28 is blocked when the corresponding drum 26 is in the closed position.

In the illustrative embodiment, the groove 28 of the corresponding drum 26 extends radially relative to the central axis 11 when the corresponding drum is in the closed position as shown in FIGS. 6 and 7. The groove 28 extends radially relative to the central axis 11 to face the groove 28 away from the gas path 25 and close off the groove 28 from the gas path 25 when the corresponding drum 26 is in the closed position. Alternatively or additionally, the groove 28 may extend at any angle relative to the central axis 11 that prevents the groove 28 to from being partially or wholly open to the gas path 25, for example, at a smaller angle than the closed position shown in FIG. 7, such as the smaller angle of the closed position shown in FIG. 26. The outer surface 46 of each drum 26 forms a part of the outer boundary of the gas path 25 to block fluid communication between the gas path 25 and the groove 28 when each of the drums 26 are in the closed position.

In the open position, the groove 28 of each corresponding open drum 26 faces towards the gas path 25 so that the groove 28 is open to the gas path 25 to allow air to flow into the groove 28 from the gas path 25 as shown in FIGS. 5 and 8. The groove 28 faces towards the gas path 25 to form recesses in the outer boundary of the gas path 25. In this way, air from the gas path 25 is allowed to flow into the recess in the outer boundary of the gas path 25 created by the groove 28 to recirculate air at the tips of the fan blades 14.

In the open position, the groove 28 of each corresponding open drum 26 extends radially relative to the central axis 11 to open the groove 28 to the gas path 25 to allow fluid communication between the gas path 25 and the groove 28 as shown in FIG. 8. In other words, in the open position, the groove 28 extends perpendicular to or at a 90° angle to the inner surface 21 of the case 20.

The control unit 30 is configured to rotate the drums 26 between the different positions in response to preselected operating conditions. The preselected operating conditions include a plurality of preprogrammed aircraft maneuvers stored on a memory 64 included in the control unit 30. The plurality of preprogrammed aircraft maneuvers include banks, turns, rolls, etc.

The control unit 30 is configured to detect a preprogrammed aircraft maneuver included in the plurality of preprogrammed aircraft maneuvers on the memory 64. Once the preprogrammed aircraft maneuver is detected, the control unit 30 directs each of the drums 26 to rotate to a corresponding position in response to detecting the preprogrammed aircraft maneuver.

For example, the plurality of drums 26 may normally be in the closed position during a cruise condition so that no additional stall margin is created, but performance is not compromised. The cruise condition included in the preselected operating conditions corresponds to when the aircraft is in the cruise portion of the flight cycle.

Then, when the control unit 30 detects a preprogrammed aircraft maneuver, i.e. banks, turns, rolls, the control unit 30 directs the drums 26 to rotate to the open position so that the groove 28 or grooves 28 face toward the gas path 25 and flow is permitted into the grooves 28. The grooves 28 allow for air to recirculate at the tips of the fan blades 14.

Conversely, when the control unit 30 detects the cruise condition after a preprogrammed aircraft maneuver, the control unit 30 may be configured to direct the drums 26 to rotate to the closed position. Therefore, once the aircraft maneuver is completed, the drums 26 rotate to the closed position to remove the recesses created in the outer boundary of the gas path 25 so that performance is not compromised and the additional stall margin is removed during the cruise condition.

The control unit 30 is configured to direct some or all of the drums 26 to rotate from the closed position to the open position based on the detected preprogrammed aircraft maneuver. Depending on the preprogrammed aircraft maneuver, the control unit 30 may direct only certain drums 26 to move to the open position, while keeping others in the closed position.

The preselected operating conditions may further include a sensor input from at least one sensor 66 included in the control unit 30. The sensor 66 is configured to measure one of pressure, air speed, altitude, blade tip timing, blade rotational speed, attitude or aircraft orientation, and acceleration. In some embodiments, the control unit 30 includes a plurality of sensors 66 each configured to measure one of pressure, air speed, altitude, blade tip timing, blade rotational speed, attitude or aircraft orientation, and acceleration.

The control unit 30 is configured to receive a measurement from the at least one sensor 66 or sensors 66 and direct the drums 26 to rotate to a corresponding position in response to the measurement of the at least one sensor 66. The control unit 30 may be configured to rotate the drums 26 to be in the closed position when the measurements from the sensor 66 are within a predetermined threshold.

Then, when the measurement from the sensor 66 is outside of the predetermined threshold, the control unit 30 directs the drums 26 to rotate to the open position. Based on the difference of the measurement from the sensor 66 compared to the predetermined threshold, the control unit 30 may vary the position of the drums 26 to control whether tip treatment is applied to the fan blades 14 of the fan 112. The control unit 30 may rotate certain drums 26 located circumferentially about the fan 112 to apply tip treatment at different areas around the fan 112. For example, the control unit 30 may direct certain drums 26 to be in the open position to open the grooves 28 of the corresponding drums 26 to the gas path 25 to allow air recirculation at that circumferential location about the fan 112.

The control unit 30 is configured to direct some or all of the drums 26 to rotate from the closed position to the open position based on the measurement from the sensor 66. The control unit 30 may direct some of the drums 26 to remain in the closed position, while directing some of the drums 26 to rotate to the opened position based on the measurement from the sensor 66.

In some embodiments, the control unit 30 may be configured to use a combination of the sensor measurements and the detected preprogrammed aircraft maneuver to control the position of the plurality of drums 26. For example, when the control unit 30 detects a preprogrammed aircraft maneuver and the measurement is outside of the predetermined threshold, the control unit 30 directs some or all of the drums 26 to rotate to the open position. The control unit 30 is configured to individual vary the angle of the groove 28 of each of the drums 26.

In some embodiments, the control unit 30 is configured to use the measurements from the sensor 66 to anticipate the aircraft maneuver. The control unit 30 is configured to direct some or all of the plurality of drums 26 to move to the open position in response to the measurement from the sensor 66 even though no preprogrammed aircraft maneuver is detected.

Alternatively, there may be a delay in the measurements from the sensor 66. Therefore, the control unit 30 is also configured to direct some or all of the drums 26 to move to the open position when the one of the preprogrammed aircraft maneuvers is detected, even though the measurements from the sensor 66 are within the predetermined thresholds.

In some embodiments, the control unit 30 may detect one of the preprogrammed aircraft maneuvers, but the measurements from the sensors 66 are within the predetermined threshold. If so, the control unit 30 may direct some or all of the drums 26 to remain in the current position.

In some embodiments, the inlet distortion mitigation system 22 may utilize a machine learning algorithm. The machine learning algorithm may track inputs, for example, aircraft speed, orientation, altitude, and/or fan speed versus a fan response, as well positioning of the drums 26, and learn how to move the inlet distortion mitigation system 22 to minimize stall margin loss. The mitigation system 22 may utilize the machine learning algorithm to gather data collected from the sensors 66 and/or other systems integrated with the engine 110 and evaluate the data, for example, to learn the correlation between certain environmental factors and/or inputs and stall margin. The algorithm may determine and learn how to minimize stall margin loss based on evaluation of the data collected, and be used by the system 22 to anticipate unfavorable conditions and better control the drums 26 to mitigate stall margin loss.

Turning again to the fan case assembly 10, the fan case assembly 10 extends circumferentially at least partway about the central axis 11 in the illustrative embodiment. In some embodiments, the fan 112 may include multiple fan case assemblies 10 arranged circumferentially about the axis 11 to form a full hoop. In other embodiments, the fan case assembly 10 may be annular and extends circumferentially about the axis 11. In some embodiments, the fan 112 may include multiple fan case assemblies 10 spaced apart circumferentially about the axis 11 to define segments between each fan case assembly 10.

The case 20 includes a forward section 32 and an aft section 34 as shown in FIG. 4. The aft section 34 is configured to be coupled to the forward section 32 to trap the plurality of drums 26 axially therebetween.

In the illustrative embodiment, the drums 26 are positioned in the case 20 so that the drums 26 extend axially across the tips of the fan blades 14 between a leading edge 16 and a trailing edge 18 of the fan blades 14 as shown in FIGS. 2, 5, and 6. Each drum 26 extends axially across the tips of the fan blades 14. The groove 28 of each drum 26 extends between the leading edge 16 and the trailing edge 18 in the illustrative embodiment. In some embodiments, the groove 28 may extend forward/aft of the leading and trailing edges 16, 18.

Figure 10:
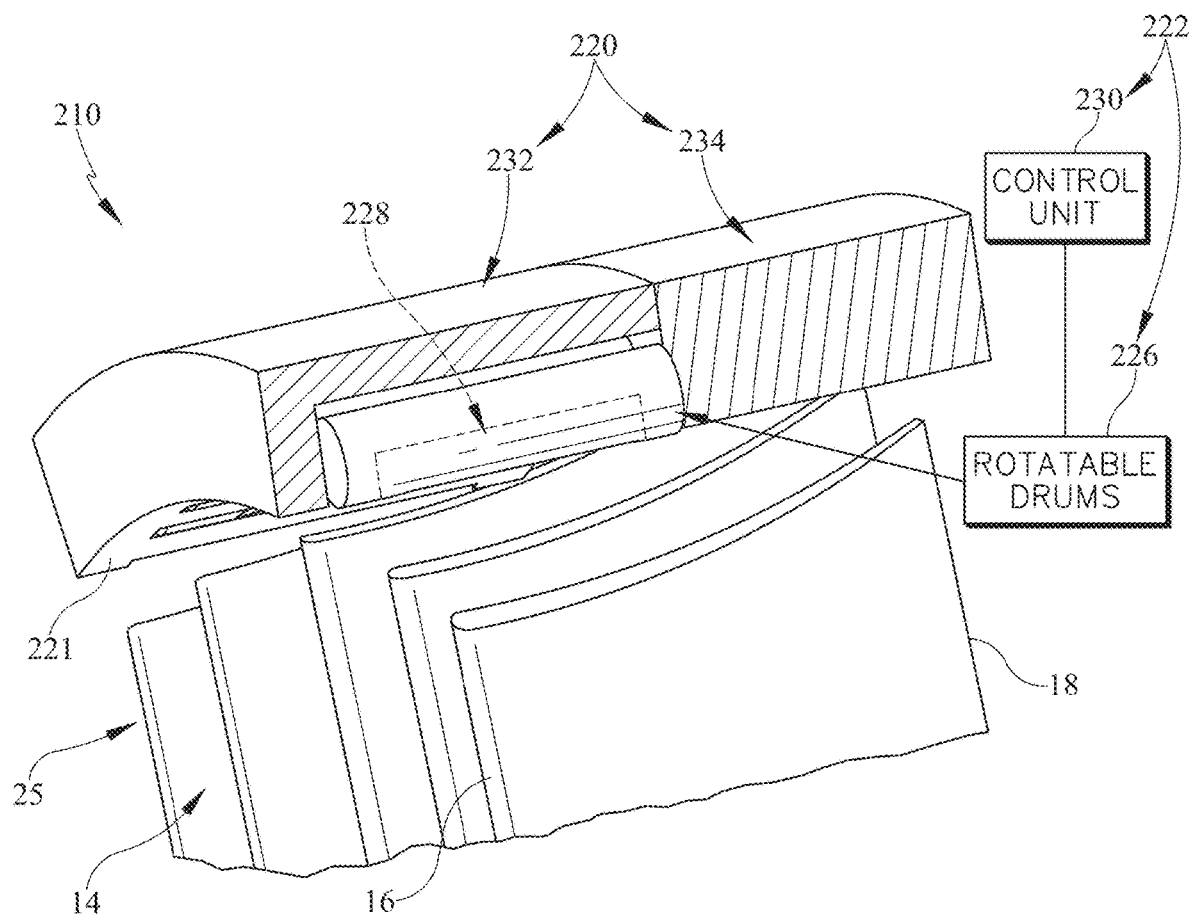
FIG. 10 is a perspective, circumferential cross-section view of another embodiment of a fan case assembly included in the gas turbine engine of FIG. 1 showing the plurality of drums are disposed at or near the leading edge of the fan blades.
Figure 11:
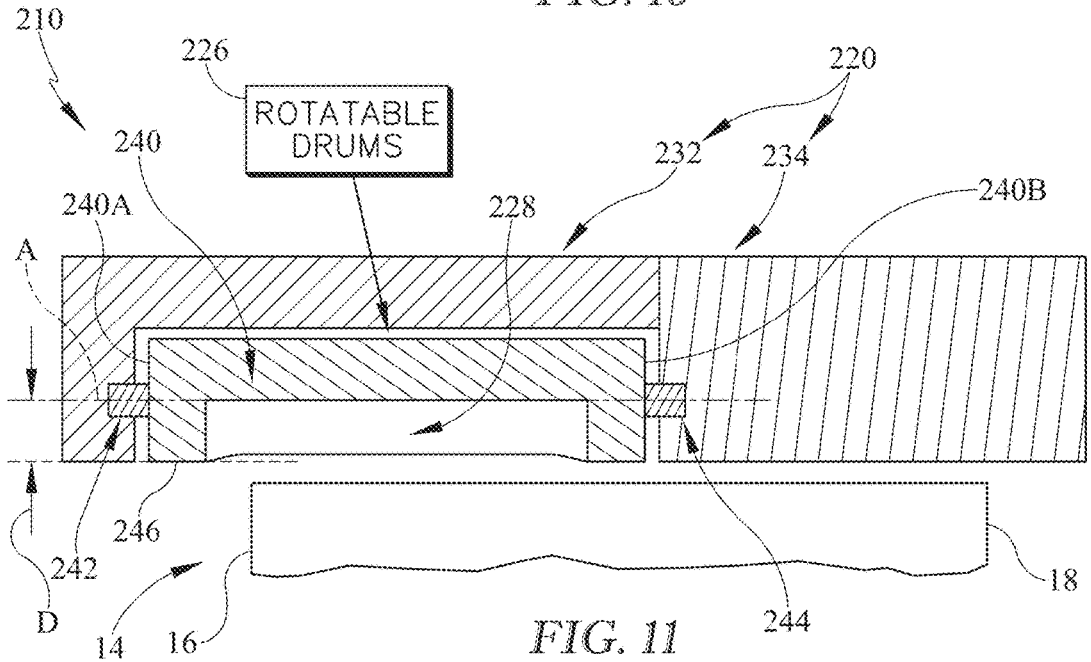
FIG. 11 is a circumferential cross-section view of the fan case assembly of FIG. 10 showing the groove formed in each drum of the plurality of drums is located at or near leading edge of the fan blades.
Figure 12:
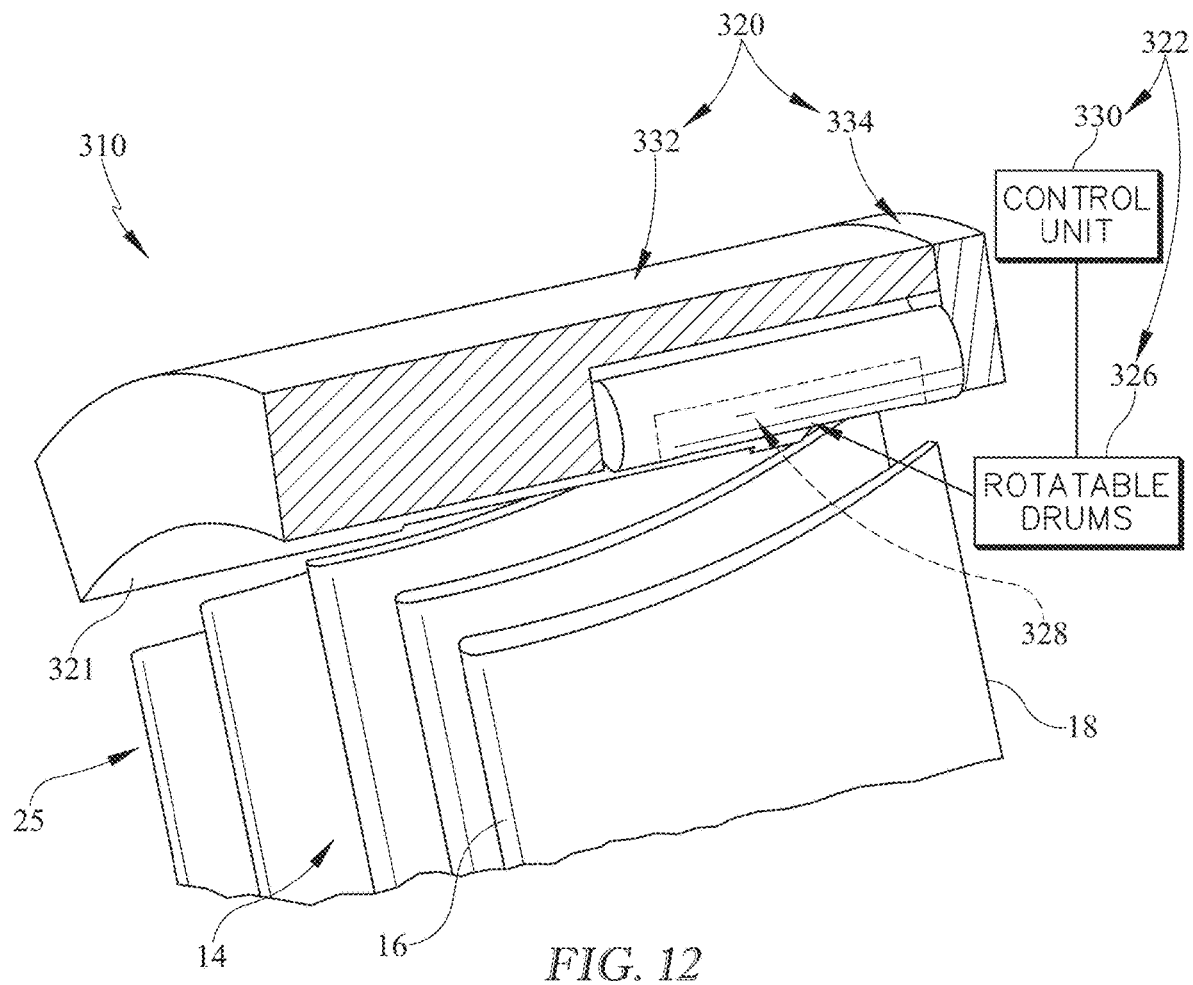
FIG. 12 is a perspective, circumferential cross-section view of another embodiment of a fan case assembly included in the gas turbine engine of FIG. 1 showing the plurality of drums are disposed at or near the trailing edge of the fan blades.
Figure 13:
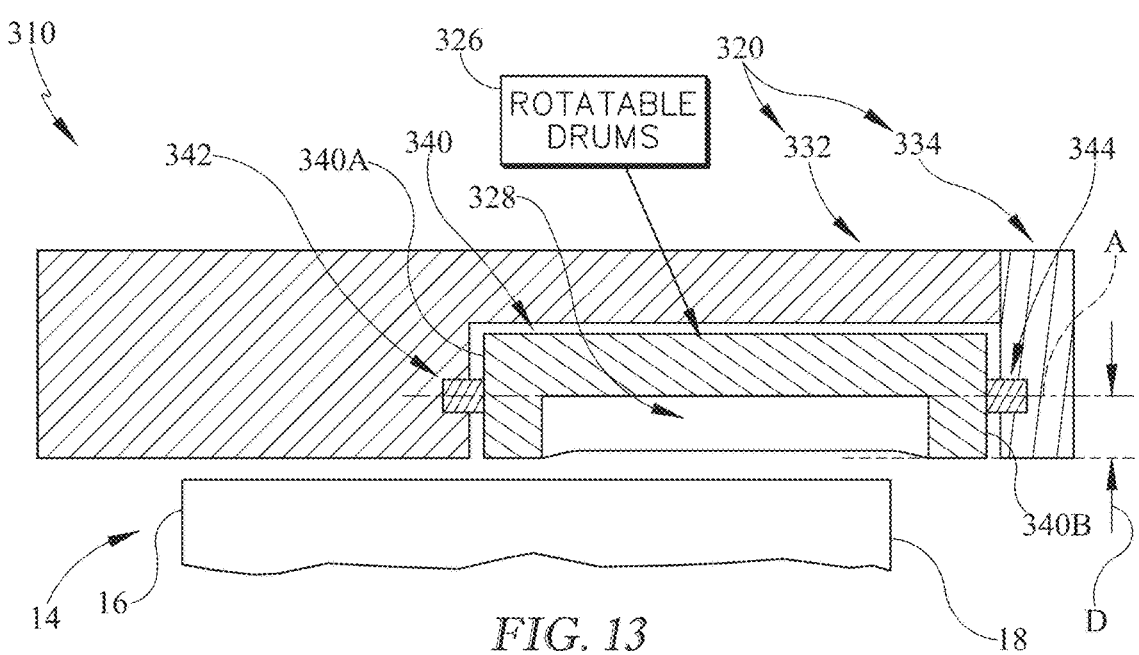
FIG. 13 is a circumferential cross-section view of the fan case assembly of FIG. 12 showing the groove formed in each drum of the plurality of drums is located at or near trailing edge of the fan blades.

In some embodiments, like as shown in FIGS. 10 and 11, the drum 26 is disposed at or near the leading edge 16 of the fan blades 14 and the groove 28 formed in each drum 26 is disposed at or near the leading edge 16. In some embodiments, like as shown in FIGS. 12 and 13, the drums 26 is disposed at or near the trailing edge 18 of the fan blades 14 and the groove 28 formed in each drum 26 is disposed at or near the trailing edge 18.

In the illustrative embodiment, the grooves 28 have a rectangular cross-sectional shape as shown in FIGS. 5-9. In some embodiments, the grooves 28 may have a curved cross-sectional shape. In some embodiments, the grooves 28 may have another cross-sectional shape.

Figure 9:
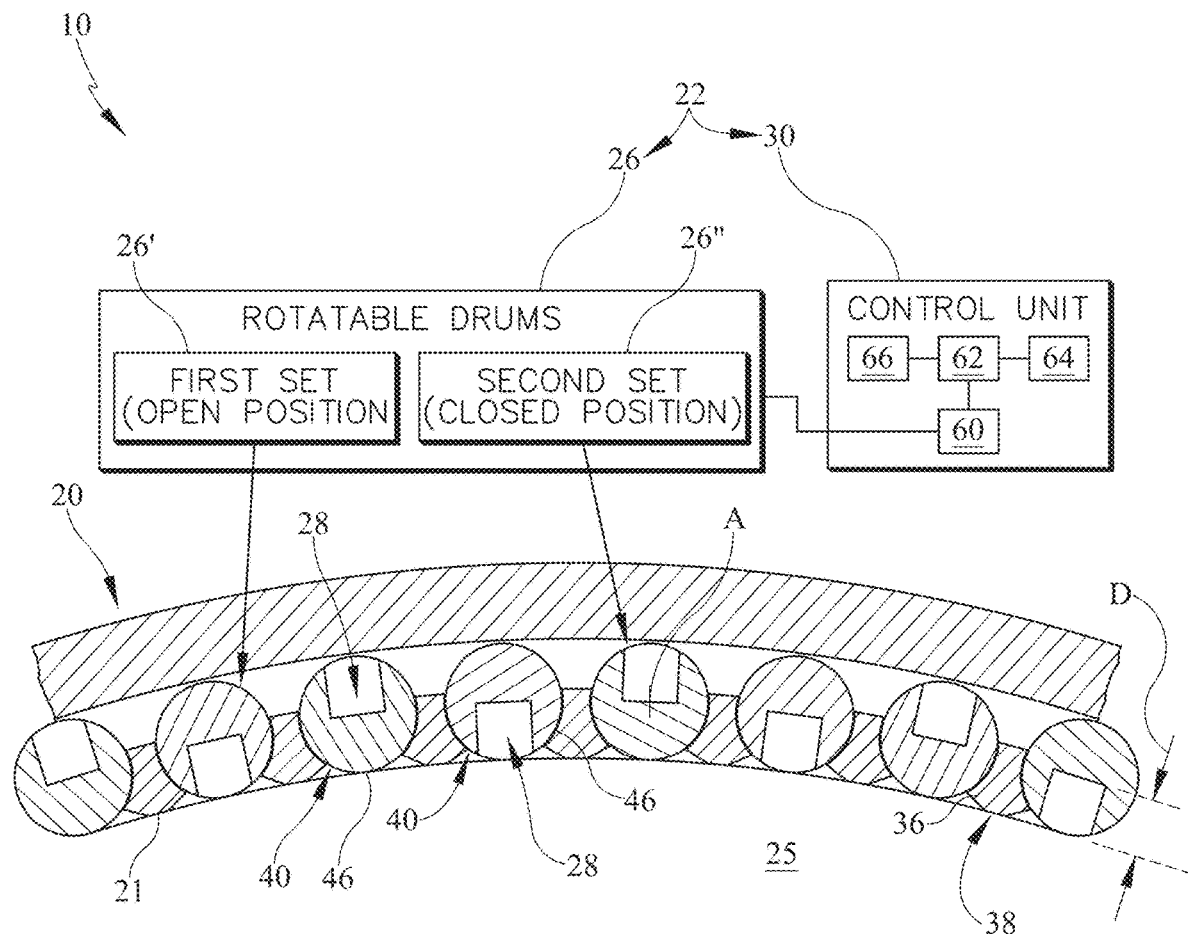
FIG. 9 is an axial cross-section view of the fan case assembly of FIG. 3 showing the plurality of drums may be rotated in different sets, the sets of drums including a first set of drums and a second set of drums alternated circumferentially between the first set of drums, and further showing the first set of drums in the open position like as shown in FIG. 8 and a second set of drums in the closed position like as shown in FIG. 7.

In the illustrative embodiment, the case 20 is formed to include a plurality of openings 36 that open to the gas path 25 as shown in FIGS. 3, 4, and 7-9. The openings 36 are spaced apart circumferentially about the central axis 11 to define partitions 38 in the case 20. Each drum 26 is arranged in the case 20 so that the drum 26 is aligned with one of the openings 36 and each partition 38 is arranged between adjacent drums 26 as shown in FIGS. 7-9. In the illustrative embodiment, each of the drums 26 extends partway into the corresponding opening 36. In this way, the outer surface 46 of each drum 26 cooperates with the inner surface 21 of the case 20 to define the outer boundary of the gas path 25.

It will be understood that the spacing of the drums 26 in FIGS. 1-9 are not to scale. For example, the drums 26 may be circumferentially spaced closer together or may be circumferentially spaced further apart in some embodiments.

In some embodiments, that there are no partitions 38. The drums 26 may be arranged closer together to minimize gaps there between and prevent fluid communication between the gas path 25 and the spaces between adjacent drums 26 and between the drums 26 and the case 20. In some embodiments, the assembly may include seals between adjacent drums 26 to limit leakage therebetween. In some embodiments, the partitions 38 may be formed between some, but not every drum 26. In the illustrative embodiment, the partitions 38 may be at least partially contoured to the shape of the drums 26 to seal or block a flow of fluid around the drums 26. Additionally or alternatively, in embodiments where channel 24 may not be present, partitions 38 may be connected to the outer portion of 34 of the case and me be one piece.

If the case 20 is a split case, like as shown in FIG. 4, the partitions 38 may be included in the forward section 32 of the case 20. In some embodiments, the partitions 38 may be part of the aft section 34 of the case 20. In some embodiments, the partitions 38 may be included in both the forward and aft sections 32, 34 of the case 20.

The inlet distortion mitigation system 22 includes the plurality of drums 26 and the control unit 30 as shown in FIGS. 2-9. Each of the drums 26 includes a drum body 40 and a pair of pegs 42, 44 as shown in FIG. 4. The drum body 40 extends between a first axial end 40A and a second axial end 40B spaced apart axially from the first axial end 40A. The drum body 40 defines an outer surface 46 that extends between the first and second axial ends 40A, 40B. The pair of pegs 42, 44 each extend from one of the axial ends 40A, 40B of the drum body 40 to the case 20 to couple the respective drum 26 to the case 20. The pair of pegs 42, 44 extend axially from the first and second axial ends 40A, 40B of the drum body 40 to fit into peg holes 42H, 44H formed in the forward and aft sections 32, 34 of the case 20.

The drum body 40 is formed to define the groove 28 as shown in FIGS. 2-9. The groove 28 extends radially partially into the drum body 40 relative to the drum axis A. The groove 28 extends axially partway along the drum body 40 relative to the drum axis A between the first and second axial ends 40A, 40B of the drum body 40.

The drums 26 are rotatable between the closed position and the open position to open/close off the grooves 28 from the gas path 25 to control the tip treatment for the fan blades 14. The drums 26 are rotated about the respective drum axis A to change the angle or position of groove 28 of the drums 26 relative to the gas path 25, thereby exposing the grooves 28 to the gas path 25 to direct flow into the grooves 28. The grooves 28 create recesses in the outer boundary of the gas path 25 to allow air to recirculate at the tips of the fan blades 14.

In the closed position, the groove 28 of each drum 26 faces away from the gas path 25 so that the outer surface 46 of the corresponding drum 26 cooperates with the inner surface 21 to define a portion of the outer boundary of the gas path 25, thereby removing the tip treatment benefit. In the closed position, the groove 28 of each drum 26 is arranged to extend radially relative to the central axis, perpendicular to the inner surface 21 such that the groove 28 is facing away from the gas path 25 in the illustrative embodiment.

In some embodiments, the groove 28 may be arranged to extend circumferentially when the corresponding drum 26 is in the closed position so that the groove 28 remains facing away from the gas path 25. In some embodiments, the groove 28 may be arranged to extend radially and circumferentially or may be angled when the corresponding drum 26 is in the closed position so that the groove 28 remains facing away from the gas path 25. In other words, in the closed position, the groove 28 of the corresponding drum 26 faces away from the gas path 25 such that the groove 28 is not open to the gas path 25.

Figure 26:
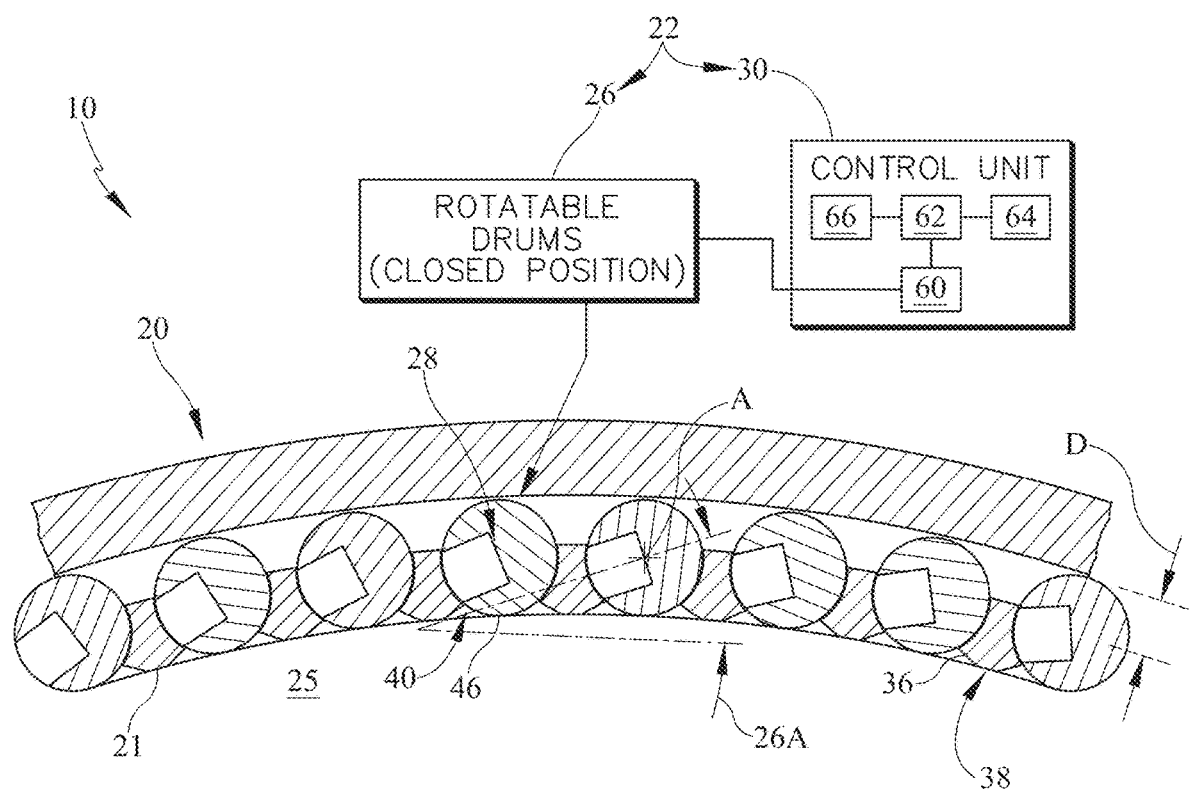
FIG. 26 is an axial cross-section view of the fan case assembly of FIG. 3 showing the plurality of drums in another closed position in which the groove of the corresponding drum faces away from the gas path to close off the groove from the gas path so that the outer surface of the corresponding drum cooperates with the inner surface of the case to define a portion of the outer boundary of the gas path.

In the open position, the groove 28 of each drum 26 faces radially inward toward the gas path 25 to form the recess and allows the flow of air into the groove 28. In the open position, the groove 28 of each drum 26 is arranged to extend radially relative to the central axis, perpendicular to the inner surface 21 and facing towards the gas path 25—in other words, rotated 180° from the closed position so the groove 28 faces the inner surface 21 of the case 20 and forms part of the boundary of the gas path 25. Additionally, or alternatively, in the open position, the drum 26 may be rotated potentially less the 180° if the angle of the groove is smaller than shown in FIG. 7, for example, as shown in FIG. 26, and sufficiently closed to not communicate.

In the illustrative embodiment, the groove 28 is arranged to extend radially relative to the central axis when the corresponding drum 26 is in the open position. In some embodiments, the groove 28 may be arranged to extend radially and circumferentially relative to the axis 11 or may be angled relative to the inner surface 21 of the fan case 20 when the corresponding drum 26 is in the open position. The groove 28 of the corresponding drum 26 is still open to the gas path 25, but extends radially and circumferentially relative the axis 11 of the gas turbine engine 110. The groove 28 may be angled in either circumferential direction about the axis 11 of the gas turbine engine when the corresponding drum 26 is in the open position.

In the illustrative embodiment, the plurality of drums 26 may rotate in either direction about the drum axis A between the different positions. In some embodiments, the plurality of drums 26 may be configured to rotate in a first direction about the drum axis A from the closed position to the open position. The drums 26 may be configured to rotate in a second direction about the respective drum axis A opposite the first direction to go back to the closed position. In some embodiments, the drums 26 may be configured to continue to rotate in the first direction to go back to the closed position.

The plurality of drums 26 may be configured to rotate in the second direction about the drum axis A from the closed position to the open position. The drums 26 may be configured to rotate in the first direction about the respective drum axis A opposite the second direction to go back to the closed position. In some embodiments, the drums 26 may be configured to continue to rotate in the second direction to go back to the closed position.

In some embodiments, each of the drums 26 may be configured to rotate 180 degrees about the drum axis A. The plurality of drums 26 may configured to rotate in the first direction 180 degrees about the drum axis A from the closed position to another closed position with the drum 26 flipped. The plurality of drums 26 may configured to rotate in the second direction 180 degrees about the drum axis A from the closed position back to the original closed position with the drum 26. In some embodiments, each of the drums 26 may be configured to rotate 360 degrees about the drum axis A in either the first direction and/or the second direction.

The control unit 30 includes at least one actuator 60, a controller 62, a memory 64, and at least one sensor 66 as shown in FIGS. 3 and 7-9. The actuator 60 is coupled to drums 26. The actuator 60 is configured to drive the rotating motion of the drums 26. The controller 62 is coupled to the actuator 60 to direct the actuator 60 to rotate the drums 26 between the different positions.

The actuator 60 is configured to rotate the drums 26 between the closed position as shown in FIG. 7 and the open position as shown in FIG. 8. The actuator 60 may also be configured to rotate the drums 26 to intermediate positions between the closed and open positions. The controller 62 is configured to direct the actuator 60 to rotate the drums 26 between the different positions in response to preselected operating conditions. The preselected operating conditions include the plurality of preprogrammed aircraft maneuvers stored on the memory 64 included in the control unit 30.

The controller 62 of the control unit 30 is configured to detect a preprogrammed aircraft maneuver included in the plurality of preprogrammed aircraft maneuvers on the memory 64. Once the preprogrammed aircraft maneuver is detected, the controller 62 directs the actuator 60 to rotate some or all of the drums 26 to a corresponding position in response to detecting the preprogrammed aircraft maneuver.

An extension linkage or rod may be coupled to one of the pegs 42, 44 at and end of each drum 26 that may be directly or indirectly coupled to the actuator 60. A crank may be positioned outside of the fan case 20, and may link the actuator 60 to the drums 26. The drums 26 may be ganged together, for example, with gears, a curved rack, and/or a belt. Additionally or alternatively, a motor may be disposed at the end of each drum 26 for individual control of the drums 26, and may be included in the fan case 20.

In some embodiments, multiple drums 26 may be coupled together to sync movement of the drums 26. The drums 26 may be coupled or linked together so that when the controller 62 directs the actuator 60 to rotate the drums 26, the actuator 60 moves to simultaneously rotate the plurality of coupled drums 26 to the desired position.

In some embodiments, different sets of drums 26 may be coupled together. The control unit 30 may include multiple actuators 60 each coupled to a respective different set of coupled drums 26 to control the positions of the drums 26 in groups so that some of the drums 26 move together in unison, while other drums 26 are independently controlled from the first group.

In some embodiments, the control unit 30 includes a separate actuator 60 for each drum 26. Each actuator 60 may be coupled to one of the respective drums 26. In this way, the controller 62 independently controls the position of each drum 26.

In some embodiments, the actuator 60 may include pneumatic or electric actuators, or combinations of hydraulic, pneumatic, and electric. Any other actuator known to a person skilled in the art could be utilized as well.

The controller 62 of the control unit 30 is configured to direct the actuator(s) 60 to rotate some or all of the drums 26 from the closed position to the open position based on the detected preprogrammed aircraft maneuver. As shown in FIG. 8, the controller 62 has directed the actuator(s) 60 to rotate all of the drums 26 to the opened position.

Depending on the preprogrammed aircraft maneuver, the controller 62 of the control unit 30 may direct certain actuators 60 to only rotate certain drums 26 to the open position, while keeping others in the closed position. As shown in FIG. 13, the controller 62 has directed the actuator (s) 60 to rotate some of the drums 26, or the first set of drums 26', to the open position, while keeping other drums 26, or a second set of drums 26", in the closed position.

In the illustrative embodiment, the first set of drums 26' is alternated between the second set of drums 26" as shown in FIG. 9. In some embodiments, the different sets 26', 26" are arranged in series. In some embodiments, the different sets 26', 26" are arranged in groups spaced apart circumferentially. In some embodiments, the different sets 26', 26" may have drums 26 located at different circumferential locations spaced about the axis 11.

In the illustrative embodiment, the number of drums 26 in the first set of drums 26' is equal to the number of drums 26 in the second set of drums 26". In some embodiments, the number of drums 26 in one set 26', 26" may be less than or greater than the number of drums 26 in the other set 26', 26". In some embodiments, the controller 62 may not control the drums 26 in sets, but rather direct certain actuator(s) 60 to rotate certain drum(s) 26 to the open position, while keeping other drums 26 in the closed position.

Additionally, the controller 62 of the control unit 30 may direct the actuator(s) 60 to move all the drums 26 to an open position, but alter the position of the groove 28 between the different drums 26. In other words, the control unit 30 is configured to individual vary the angle of each of the grooves 28 of the drums 26. In some embodiments, the controller 62 of the control unit 30 may direct certain actuators 60 to rotate some of the drums 26 to the open position in which the corresponding groove 28 is arranged to extend radially relative to the central axis, while other actuators 60 rotate other drums to the open position in which the corresponding groove 28 is arranged to extend radially and circumferentially relative to the axis 11. Simultaneously, the controller 62 of the control unit 30 may direct certain actuator(s) 60 to keep other drums 26 in the closed position.

In some embodiments, the control unit 30 may control the plurality of rotatable drums 26 in more than two sets. In some embodiments, the plurality of drums 26 may have more than two sets of drums. In some embodiments, may have less than two sets of drums.

The preselected operating conditions may further include a sensor input from the sensor 66 or sensors 66 included in the control unit 30. The sensor 66 is configured to measure one of pressure, air speed, and acceleration. The sensor 66 is also configured to detect distortion, fan stall, and/or other aeromechanical issues. In some embodiments, the control unit 30 includes a plurality of sensors 66 each configured to measure one of pressure, air speed, and acceleration and/or detect distortion, fan stall, and/or other aeromechanical issues.

The sensor 66 may include one of or a combination of dynamic sensors, static wall pressure sensors, altitude sensors, sensors configured to detect the angle of attack of the plurality of fan blades 14, sensors configured to detect the tip timing of the plurality of fan blades 14, and air speed sensors. In some embodiments, the sensor 66 may be a dynamic pressure transducer. The sensor 66 may also be a sensor configured to measure a rotational speed of the fan blades 14, which could be used along with an additional sensor that is a dynamic pressure transducer. In some embodiments, the sensor 66 may be a sensor configured to measure a rotation speed of another section of the engine 110.

The controller 62 of the control unit 30 is configured to receive a measurement from the sensor 66 or sensors 66 and direct the actuator 60 to rotate some or all of the drums 26 to a corresponding position in response to the measurement of the at least one sensor 66. The controller 62 of the control unit 30 may be configured to direct actuator 60 to rotate some or all of the drums 26 to the closed position when the measurements from the sensor 66 are within a predetermined threshold.

Then, when the measurement from the sensor 66 is outside of the predetermined threshold, the controller 62 directs the actuator 60 to rotate some or all of the drums 26 to the open position. Based on the difference of the measurement from the sensor 66 compared to the predetermined threshold, the controller 62 may vary the position of the drums 26 to control the tip treatment applied to the fan blades 14 by opening/closing the groove(s) 28 to the gas path 25.

In some embodiments, the controller 62 of the control unit 30 may be configured to use a combination of the sensor measurements and the detected preprogrammed aircraft maneuver to control the position of the drums 26. For example, when the controller 62 of the control unit 30 detects a preprogrammed aircraft maneuver and the measurement is outside of the predetermined threshold, the controller 62 directs the actuator 60 to rotate some or all of the drums 26 to the open position.

In some embodiments, the controller 62 of the control unit 30 is configured to use the measurements from the sensor 66 to anticipate the aircraft maneuver. The controller 62 of the control unit 30 is configured to direct the actuator 60 to rotate some or all of the drums 26 to the open position in response to the measurement from the sensor 66 even though no preprogrammed aircraft maneuver is detected.

Alternatively, there may be a delay in the measurements from the sensor 66. Therefore, the controller 62 of the control unit 30 is also configured to direct the actuator 60 to rotate some or all of the drums 26 to the open position when the one of the preprogrammed aircraft maneuvers is detected, even though the measurements from the sensor 66 are within the predetermined thresholds.

In some embodiments, the controller 62 of the control unit 30 may detect one of the preprogrammed aircraft maneuvers, but the measurements from the sensors 66 are within the predetermined threshold. If so, the controller 62 of the control unit 30 may direct some or all of the drums 26 to remain in the current position.

A method of operating the inlet distortion mitigation system 22 may include several steps. During normal cruise conditions, the controller 62 directs the actuator 60 to locate the rotatable drums 26 in the closed position. In other words, the inlet distortion mitigation system 22 is kept in the closed mode during normal cruise conditions so that the groove 28 or grooves 28 face away from the gas path 25.

If the controller 62 detects one of a preselected operating condition other than the cruise condition, the controller 62 directs the actuator 60 to rotate the drums 26 to the open position depending on the operating condition detected to minimize the negative effects of pressure and swirl distortions to improve stall margin. In other words, the inlet distortion mitigation system 22 changes to the open mode so that the groove 28 or grooves 28 face toward the gas path 25. In the open position, the grooves 28 of the drums 26 may extend radially relative to the axis 11 or the grooves 28 of the drums 26 may extend radially and circumferentially relative to the axis 11.

The method further includes continually adjusting the position of some or all of the drums 26 based on the preselected operating condition of the engine 110. If the controller 62 detects the cruise condition the controller 62 directs the actuator 60 to rotate the drums 26 back to the closed position. In other instances, the controller 62 may direct the actuator 60 to control the position of the drums 26 as discussed above based on the preprogrammed aircraft maneuvers and/or the measurements from the sensors.

Figure 20:
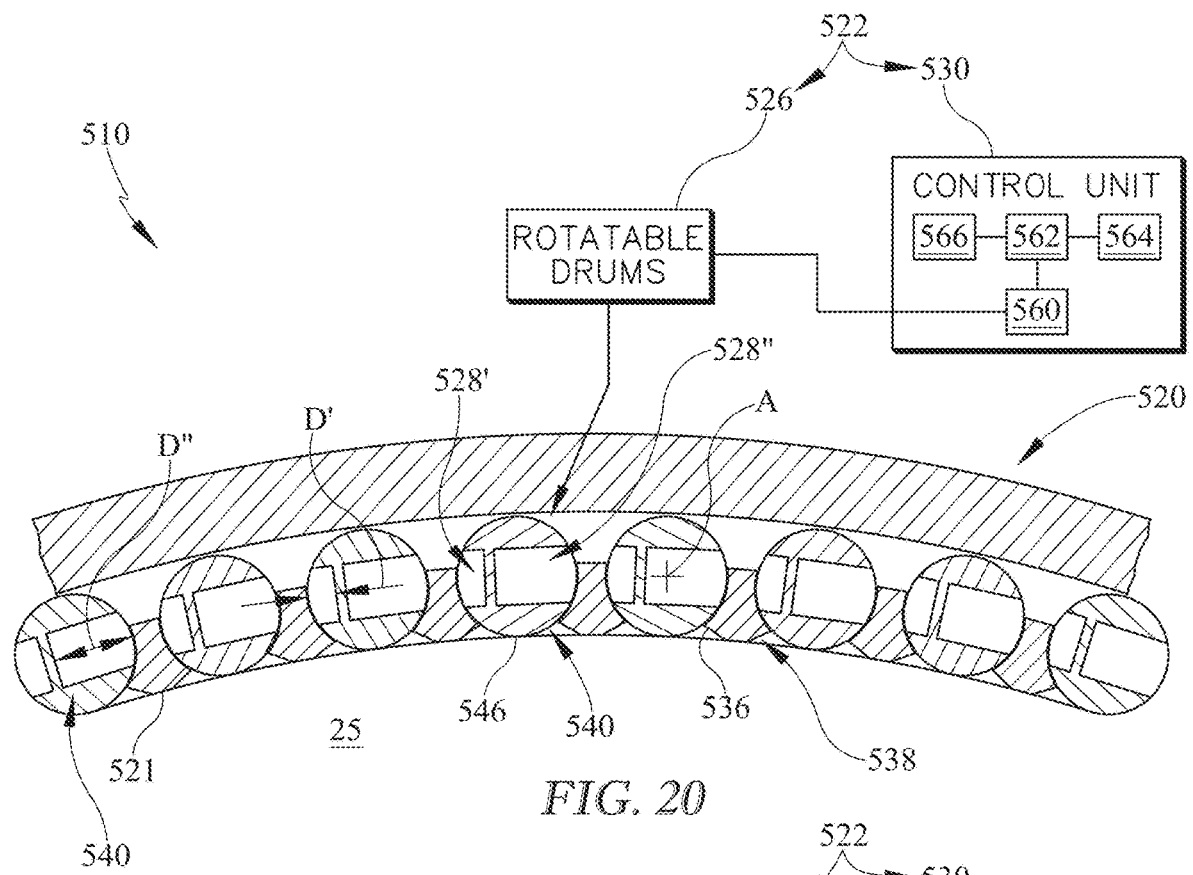
FIG. 20 is an axial cross-section view of the fan case assembly of FIG. 19 showing the plurality of drums in the closed position in which both the deep and shallow grooves of the corresponding drum face away from the gas path to close off both grooves from the gas path so that an outer surface of the corresponding drum cooperates with an inner surface of the case to define a portion of the outer boundary.

The grooves 28 of the corresponding drums 26 face away from the gas path 25 whenever the groove 28 is closed off from or not open to the gas path 25 so that fluid communication between the gas path 25 and the groove 28 is blocked. As shown in FIGS. 5 and 8, the grooves 28 face radially outward away from the gas path 25. In some embodiments, the grooves 28 face away from the gas path 25 by extending circumferentially like as shown in FIG. 20.

The grooves 28 of the corresponding drums 26 face towards the gas path 25 whenever the groove 28 is open to the gas path 25 so that fluid communication between the gas path 25 and the groove 28 is allowed. As shown in FIGS. 6 and 7, the grooves 28 face radially inward toward the gas path 25. In some embodiments, the grooves 28 may extend radially and circumferentially relative to the axis 11, but still remain facing toward the gas path 25 as the grooves 28 are still in fluid communication with the gas path 25.

When dealing with embedded inlet distortion, there may be a steep trade between stall margin and performance of the engine. There may be points during a mission or moments with maneuvers where it may be desirable to incorporate a different available stall margin. Attempting to solve the worst stall condition, while maintaining performance over all of the cycle or flight conditions may be difficult and result in compromised efficiency or a limited flight envelope.

Another embodiment of a fan case assembly 210 in accordance with the present disclosure is shown in FIGS. 10 and 11. The fan case assembly 210 is substantially similar to the fan case assembly 10 shown in FIGS. 1-9 and described herein. Accordingly, similar reference numbers in the 200 series indicate features that are common between the fan case assembly 10 and the fan case assembly 210. The description of the fan case assembly 10 is incorporated by reference to apply to the fan case assembly 210, except in instances when it conflicts with the specific description and the drawings of the fan case assembly 210.

The fan case assembly 210 includes, among other components, a case 220 and an inlet distortion mitigation system 222 as shown in FIGS. 10 and 11. The case 220 extends circumferentially at least partway about the axis 11 to define the outer boundary of the gas path 25 of the gas turbine engine 110. The inlet distortion mitigation system 222 includes a plurality of rotatable drums 226 spaced circumferentially in the fan case assembly 210 and a control unit 230 as shown in FIGS. 10 and 11. The plurality of drums 226 are rotatably coupled to the case 220 to rotate about a drum axis A. The plurality of drums 226 are configured to rotate between the closed and open positions like as shown in FIGS. 7-9. The control unit 230 is configured to move the plurality of drums 226 between the different positions in response to preselected operating conditions.

The drums 226 may extend over an along a portion of the fan blades 14 at the leading edge 16 of the fan blades. The case 220 includes a forward section 232, an aft section 234, and a partition 238 as shown in FIGS. 10 and 11. The aft section 234 is configured to be coupled to the forward section 232 to trap the plurality of drums 226 axially therebetween the forward section 232 and the aft section 234 may meet at a central or mid-span of the fan blades 14.

Each of the drums 226 includes a drum body 240 and a pair of pegs 242, 244 as shown in FIG. 11. The drum body 240 extends between a first axial end 240A and a second axial end 240B spaced apart axially from the first axial end 240A. The drum body 240 defines an outer surface 246 that extends between the first and second axial ends 240A, 240B. The pair of pegs 242, 244 each extend from one of the axial ends 240A, 240B of the drum body 240 to the case 220 to couple the respective drum 226 to the case 220.

The drum body 240 is formed to define the groove 228 as shown in FIGS. 10 and 11. The groove 228 extends radially partway into the corresponding drum 226 relative to the drum axis A and extends axially between the first and second axial ends 240A, 240B of the drum body 240. The groove 228 provides recesses in the outer boundary of the gas path 25 when the groove 228 faces toward the gas path 25 to allow air to flow in to the groove 228. The groove 228 extends a certain depth D into to the drum 226. The depth D of the groove 228 may vary.

In the illustrative embodiment, the plurality of drums 226 are located closer to the leading edge 16 of the fan blades 14 as shown in FIGS. 10 and 11. The plurality of drums 226 are disposed at or near the leading edge 16 of the fan blades 14 so that the groove 228 is located at or near the leading edge 16 of the fan blades 14.

The drums 226 are rotatable between the closed position and the open position to close/open each groove 228 formed in the drums 226 to the gas path 25, thereby controlling the tip treatment applied to the fan blades 14. The control unit 230 is configured to rotate the drums 226 between the different positions in response to preselected operating conditions. The control unit 230 is configured to control the position of the drums 226 similar to the control unit 30 in FIGS. 1-9.

The preselected operating conditions include a plurality of preprogrammed aircraft maneuvers stored on a memory included in the control unit 230. The plurality of preprogrammed aircraft maneuvers include banks, turns, rolls, etc.

The control unit 230 is configured to detect a preprogrammed aircraft maneuver included in the plurality of preprogrammed aircraft maneuvers. Once the preprogrammed aircraft maneuver is detected, the control unit 230 directs each of the drums 226 to rotate to a corresponding position in response to detecting the preprogrammed aircraft maneuver.

For example, the drums 226 may normally be in the closed position during a cruise condition so that no additional stall margin is created, but performance is not compromised. Then, when the control unit 230 detects a preprogrammed aircraft maneuver, i.e. banks, turns, rolls, the control unit 230 directs the drums 226 to rotate to the open position so that flow is permitted into the grooves 228.

Conversely, when the control unit 230 detects the cruise condition after a preprogrammed aircraft maneuver, the control unit 230 directs the drums 226 to rotate to the closed position. Therefore, once the aircraft maneuver is completed, the drums 226 move to the closed position to performance is not compromised and the additional stall margin is removed during the cruise condition.

The control unit 230 is configured to direct some or all of the drums 226 to rotate from the closed position to the open position based on the detected preprogrammed aircraft maneuver. Depending on the preprogrammed aircraft maneuver, the control unit 230 may directly only certain drums 226 to move to the position, while keeping others in the closed position.

Similarly, the control unit 230 is configured to receive a measurement from the at least one sensor or sensors and direct the drums 226 to rotate to a corresponding position in response to the measurement like as discussed above with respect to the embodiment of FIGS. 1-9. In some embodiments, the control unit 230 may be configured to use a combination of the sensor measurements and the detected preprogrammed aircraft maneuver to control the position of the plurality of drums 226.

Another embodiment of a fan case assembly 310 in accordance with the present disclosure is shown in FIGS. 12 and 13. The fan case assembly 310 is substantially similar to the fan case assembly 10 shown in FIGS. 1-9 and described herein. Accordingly, similar reference numbers in the 300 series indicate features that are common between the fan case assembly 10 and the fan case assembly 310. The description of the fan case assembly 10 is incorporated by reference to apply to the fan case assembly 310, except in instances when it conflicts with the specific description and the drawings of the fan case assembly 310.

The fan case assembly 310 includes, among other components, a case 320 and an inlet distortion mitigation system 322 as shown in FIGS. 12 and 13. The case 320 extends circumferentially at least partway about the axis 11 to define the outer boundary of the gas path 25 of the gas turbine engine 110. The inlet distortion mitigation system 322 includes a plurality of rotatable drums 326 disposed circumferentially in the fan case assembly 310 and a control unit 330 as shown in FIGS. 12 and 13. The plurality of drums 226 are rotatably coupled to the case 320 to rotate about a drum axis A. The plurality of drums 326 are configured to rotate between the closed and open positions like as shown in FIGS. 7-9. The control unit 330 is configured to move the plurality of drums 326 between the different positions in response to preselected operating conditions.

The drums 326 may extend over an along a portion of the fan blades 14 at the trailing edge 18 of the fan blades. The case 320 includes a forward section 332, an aft section 334, and a partition 336 as shown in FIGS. 12 and 13. The aft section 334 is configured to be coupled to the forward section 332 to trap the plurality of drums 326 axially therebetween. The forward section 232 and the aft section 334 may meet at a central or mid-span of the fan blades 14.

Each of the drums 326 includes a drum body 340 and a pair of pegs 342, 344 as shown in FIG. 13. The drum body 340 extends between a first axial end 340A and a second axial end 340B spaced apart axially from the first axial end 340A. The drum body 340 defines an outer surface 346 that extends between the first and second axial ends 340A, 340B. The pair of pegs 342, 344 each extend from one of the axial ends 340A, 340B of the drum body 340 to the case 320 to couple the respective drum 326 to the case 320.

The drum body 340 is formed to define the groove 328 as shown in FIGS. 12 and 13. The groove 328 extends radially partway into the corresponding drum 326 relative to the drum axis A and extends axially between the first and second axial ends 340A, 340B of the drum body 340. The groove 328 provides recesses in the outer boundary of the gas path 25 when the groove 328 faces toward the gas path 25 to allow air to flow in to the groove 328. The groove 328 extends a certain depth D into to the drum 326. The depth D of the groove 328 may vary.

In the illustrative embodiment, the plurality of drums 326 are located closer to the trailing edge 18 of the fan blades 14 as shown in FIGS. 12 and 13. The plurality of drums 326 are disposed at or near the trailing edge 18 of the fan blades 14 so that the groove 328 is located at or near the trailing edge 18 of the fan blades 14.

The drums 326 are rotatable between the closed position and the open position to close/open each groove 328 formed in the drums 326 to the gas path 25, thereby controlling the tip treatment applied to the fan blades 14. The control unit 330 is configured to rotate the drums 326 between the different positions in response to preselected operating conditions. The control unit 330 is configured to control the position of the drums 326 similar to the control unit 30 in FIGS. 1-9.

The preselected operating conditions include a plurality of preprogrammed aircraft maneuvers stored on a memory included in the control unit 330. The plurality of preprogrammed aircraft maneuvers include banks, turns, rolls, etc.

The control unit 330 is configured to detect a preprogrammed aircraft maneuver included in the plurality of preprogrammed aircraft maneuvers. Once the preprogrammed aircraft maneuver is detected, the control unit 330 directs each of the drums 326 to rotate to a corresponding position in response to detecting the preprogrammed aircraft maneuver.

For example, both the drums 326 may normally be in the closed position during a cruise condition so that no additional stall margin is created, but performance is not compromised. Then, when the control unit 330 detects a preprogrammed aircraft maneuver, i.e. banks, turns, rolls, the control unit 330 directs the drums 326 to rotate to the open position so that flow is permitted into the grooves 328.

Conversely, when the control unit 330 detects the cruise condition after a preprogrammed aircraft maneuver, the control unit 330 directs the drums 326 to rotate to the closed position. Therefore, once the aircraft maneuver is completed, the drums 326 move to the closed position to performance is not compromised and the additional stall margin is removed during the cruise condition.

The control unit 330 is configured to direct some or all of the drums 326 to rotate from the closed position to the open position based on the detected preprogrammed aircraft maneuver. Depending on the preprogrammed aircraft maneuver, the control unit 330 may directly only certain drums 326 to move to the open position, while keeping others in the closed position.

Similarly, the control unit 330 is configured to receive a measurement from the at least one sensor or sensors and direct the drums 326 to rotate to a corresponding position in response to the measurement like as discussed above with respect to the embodiment of FIGS. 1-9. In some embodiments, the control unit 330 may be configured to use a combination of the sensor measurements and the detected preprogrammed aircraft maneuver to control the position of the plurality of drums 326.

Another embodiment of a fan case assembly 410 in accordance with the present disclosure is shown in FIGS. 14-18. The fan case assembly 410 is substantially similar to the fan case assembly 10 shown in FIGS. 1-9 and described herein. Accordingly, similar reference numbers in the 400 series indicate features that are common between the fan case assembly 10 and the fan case assembly 410. The description of the fan case assembly 10 is incorporated by reference to apply to the fan case assembly 410, except in instances when it conflicts with the specific description and the drawings of the fan case assembly 410.

Figure 14:
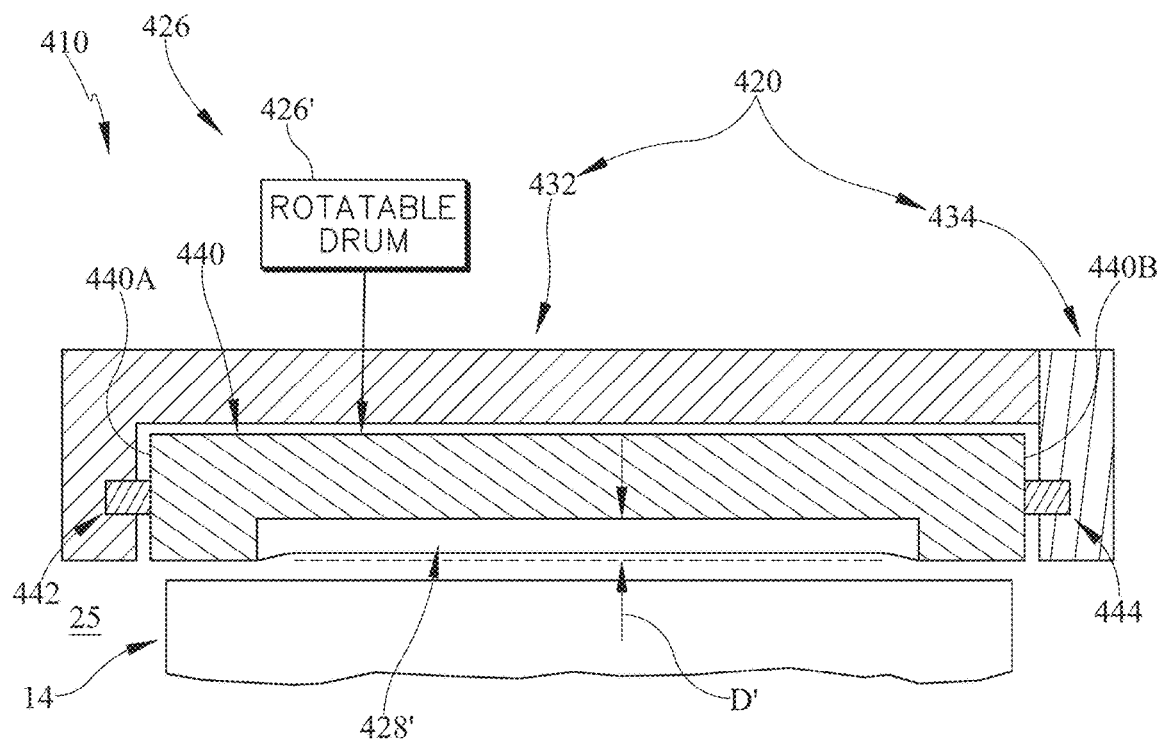
FIG. 14 is a circumferential cross-section view of another embodiment of a fan case assembly included in the gas turbine engine of FIG. 1 showing the plurality of drums includes drums having a shallow groove with a first depth.
Figure 15:
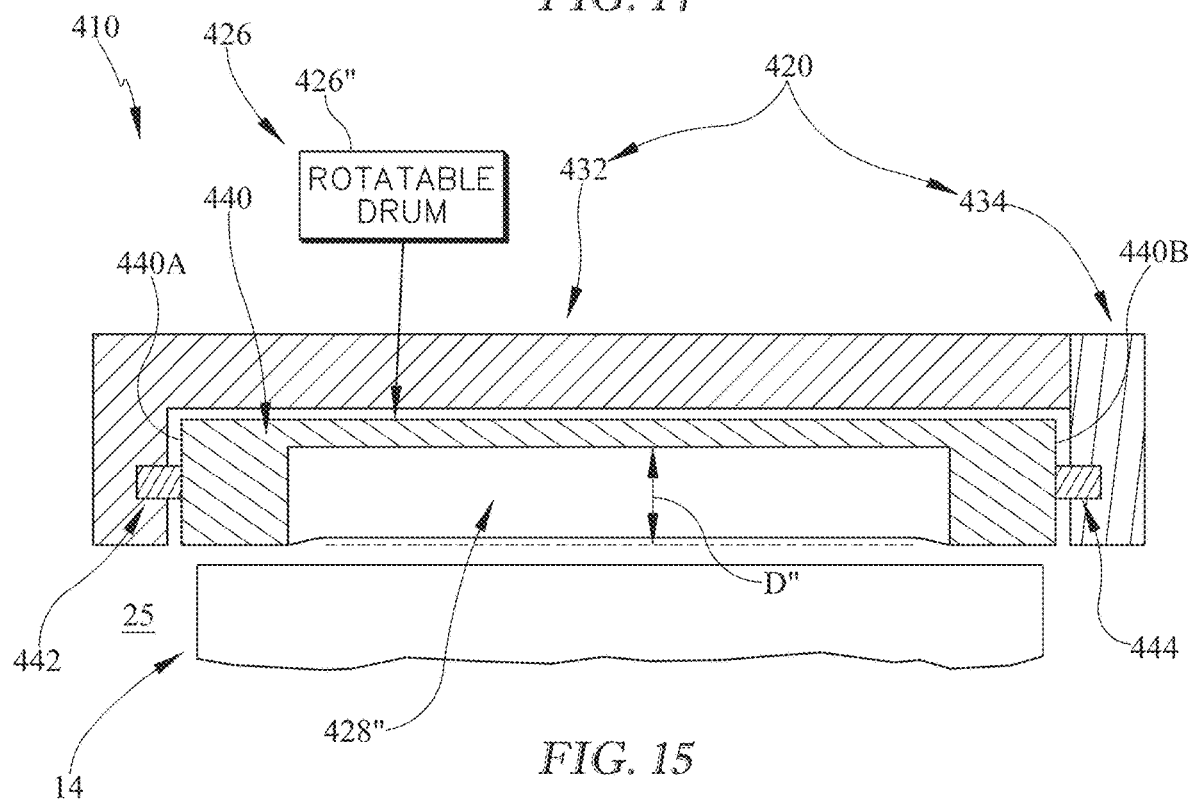
FIG. 15 is a circumferential cross-section view of the fan case assembly of FIG. 14 showing the plurality of drums includes drums having a deep groove with a second depth that is greater than the first depth of the shallow groove.
Figure 16:
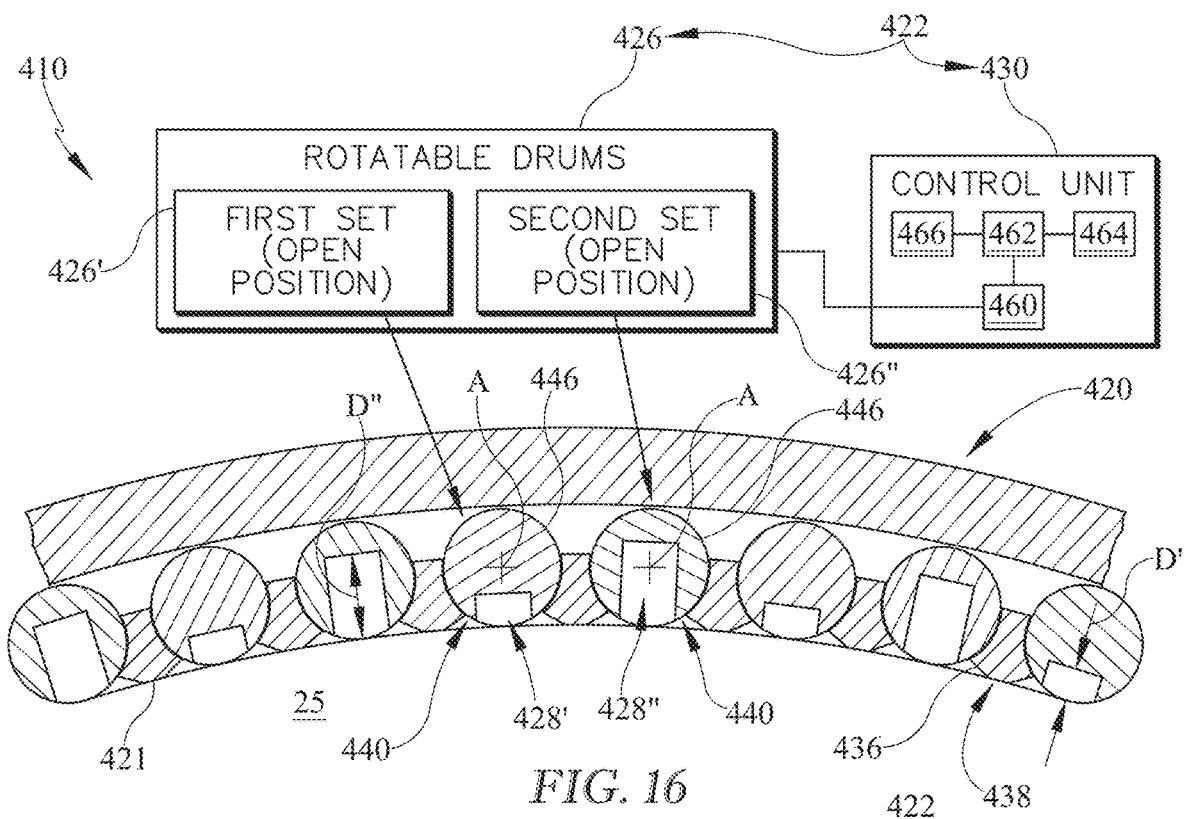
FIG. 16 is an axial cross-section view of the fan case assembly of FIGS. 14 and 15 showing the plurality of drums alternate between drums having a shallow groove and a deep groove, and further showing the plurality of drums all in the open position in which the groove of the corresponding drum faces towards the gas path so that the groove is open to the gas path to allow air to flow into the grooves from the gas path.
Figure 17:
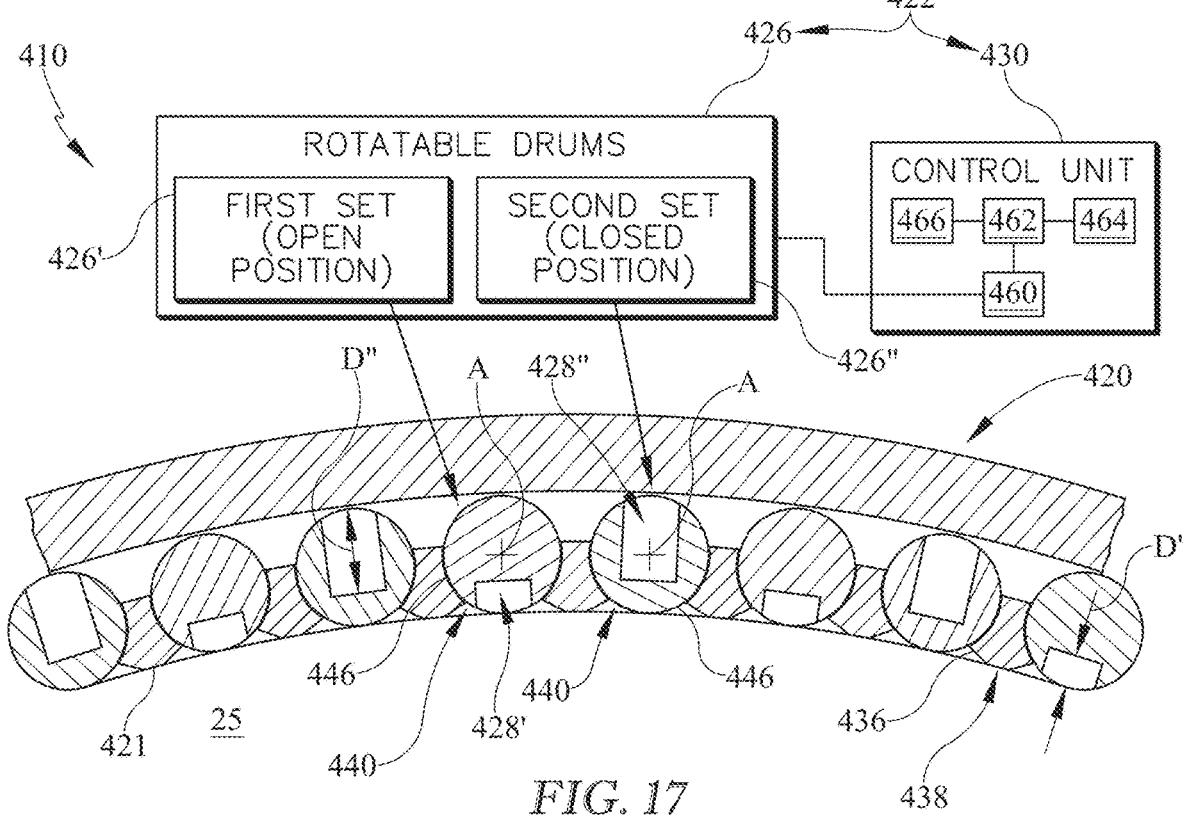
FIG. 17 is an axial cross-section view of the fan case assembly of FIGS. 14 and 15 showing the plurality of drums may be rotated in different sets, the sets of drums including a first set of drums each having a shallow groove and a second set of drums each having a deep groove, and further showing the first set of drums in the open position in which the shallow groove faces towards the gas path and the second set of drums in the closed position.
Figure 18:
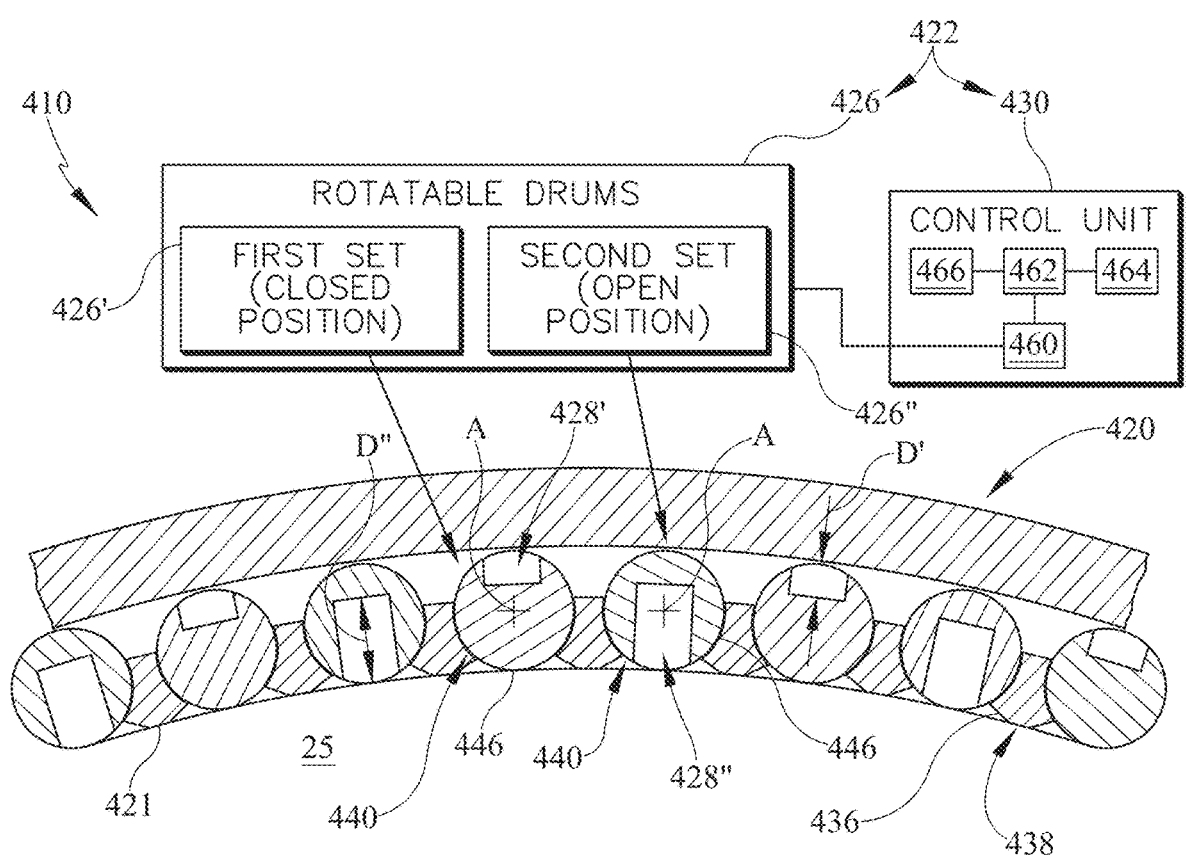
FIG. 18 is an axial cross-section view of the fan case assembly of FIGS. 14 and 15, showing the first set of drums with the shallow grooves in the closed position and the second set of drums with the deep grooves in the open position in which the deep groove faces towards the gas path.

The fan case assembly 410 includes, among other components, a case 420 and an inlet distortion mitigation system 422 as shown in FIGS. 14-18. The case 420 extends circumferentially at least partway about the axis 11 to define the outer boundary of the gas path 25 of the gas turbine engine 110. The inlet distortion mitigation system 422 includes a plurality of rotatable drums 426 disposed circumferentially in the fan case assembly 410 and a control unit 430 as shown in FIGS. 16-18. The plurality of drums 426 are rotatably coupled to the case 420 to rotate about a drum axis A. The plurality of drums 426 are configured to rotate between the closed and open positions like as shown in FIGS. 7-9 and 16-18. The control unit 430 is configured to move the plurality of drums 426 between the different positions in response to preselected operating conditions to control fluid communication between the grooves 428', 428" and the gas path 25.

The drums 426 may extend over and along all or a portion of the fan blades 14, for example, along the full length of the fan blades 14 as shown in FIGS. 14 and 15, near the leading edge 16 of the fan blades 14 as shown in FIGS. 10 and 11, or near trailing edge 18 of the fan blades as shown in FIGS. 12 and 13. The case 420 includes a forward section 432, an aft section 434, and a partition 436 as shown in FIGS. 14 and 15. The aft section 434 is configured to be coupled to the forward section 432 to trap the plurality of drums 426 axially therebetween.

Each of the drums 426 includes a drum body 440 and a pair of pegs 442, 444 as shown in FIGS. 14 and 15. The drum body 440 extends between a first axial end 440A and a second axial end 440B spaced apart axially from the first axial end 440A. The drum body 440 defines an outer surface 446 that extends between the first and second axial ends 440A, 440B. The pair of pegs 442, 444 each extend from one of the axial ends 440A, 440B of the drum body 440 to the case 420 to couple the respective drum 426 to the case 420.

The drum body 440 is formed to define the groove 428', 428". The groove 428', 428" extends radially partway into the drum body 440 and extends axially between the first and second axial ends 440A, 440B of the drum body 440. The groove 428', 428" provides recesses in the outer boundary of the gas path 25 when the groove 428', 428" faces toward the gas path 25 to allow air to flow in to the groove 428', 428".

The groove 428', 428" extends a certain depth D', D" into to the drum 426. In the illustrative embodiment, the different drums 426', 426" included in the plurality of rotatable drums 426 have grooves 428', 428" of varying depths D', D" as shown in FIGS. 14-18.

The plurality of drums 426 may include a first set of drums 426' with a relatively shallow groove 428' and a second set of drums 426" with a relatively deep groove 428" compared to the groove 428' on the first set of drums 426'. The shallow groove 428'—also referred to as the first groove 428'—has a first depth D' as shown in FIG. 14, while the deep groove 428"—also referred to as the second groove 428"—has a second depth D" as shown in FIG. 15. The second depth D" of the deep groove 428" is greater than the first depth D' of the shallow groove 428'. The depth D' of the shallow groove 428' of the first set of drums 426' is smaller than or less than the depth D" of the deep groove 428" of the second set of drums 426" such that the deep groove 428" extends further in to the respective drum" of the second set of drums 426" than the shallow groove 428' extends into the respective drum 426' of the first set of drums 426" as shown in FIGS. 14-18.

The drums 426 are rotatable between the closed position and the open position to close/open each groove 428', 428" formed in the drums 426', 426" to the gas path 25, thereby controlling the tip treatment applied to the fan blades 14. The control unit 430 is configured to rotate the drums 426 between the different positions in response to preselected operating conditions. The control unit 430 is configured to control the position of the drums 426 similar to the control unit 30 in FIGS. 1-9.

The plurality of drums 426 are each configured to rotate between closed and open positions as shown in FIGS. 16-18. Each rotatable drum 426', 426" included in the plurality of rotatable drums 426 rotates about the drum axis A to open the corresponding groove 428', 428" towards the gas path 25. When the groove 428', 428" faces towards or is open to the gas path 25, air from the gas path 25 is allowed to flow into the groove 428', 428" to recirculate air locally at the tips of the fan blades 14. To remove tip treatment, each of the rotatable drums 426', 426" rotate to close off the groove 428', 428" from the gas path 25 so that the drums 426', 426" cooperate with the inner surface 421 of the case 420 to form the outer boundary of the gas path 25.

The control unit 430 is configured to rotate each of the plurality of drums 426 about the corresponding drum axis A between the different positions in response to preselected operating conditions to control tip treatment of the fan blades 14. The control unit 430 is configured to rotate each of the drums 426 to control whether the grooves 428', 428" in each drum 426', 426" face toward or away from the gas path 25, thereby controlling whether the grooves 428', 428" are in fluid communication with the gas path 25 to recirculate air at the tips of the fan blades 14. The control unit 430 controls the application of the tip treatment to the fan blades 14 so as to minimize the negative effects of pressure and swirl distortions in the gas turbine engine 110 to improve stall margin for the gas turbine engine 110.

In the closed position, the groove 428', 428" of each corresponding closed drum 426', 426" faces away from the gas path 25 so that the outer surface 446 of each drum 426', 426" cooperates with the inner surface 421 of the case 420 to define the outer boundary of the gas path 25 as shown in FIGS. 17 and 18. The outer surface 446 of each drum 426', 426" forms a part of the outer boundary of the gas path 25 to form a uniform/consistent inner surface 421 or outer boundary of the gas path 25, i.e. no recesses or discontinuities are formed in the outer boundary of the gas path 25 such that tip treatment is removed. Fluid communication between the gas path 25 and the groove 428', 428" is blocked when the corresponding drum 426', 426" is in the closed position.

In the open position, the groove 428', 428" of each corresponding open drum 426', 426" faces towards the gas path 25 so that the groove 428', 428" is open to the gas path 25 to allow air to flow into the groove 428', 428" from the gas path 25 as shown in FIGS. 16-18. The groove 428', 428" faces towards the gas path 25 to form recesses in the outer boundary of the gas path 25. In this way, air from the gas path 25 is allowed to flow into the recess in the outer boundary of the gas path 25 created by the groove 428', 428" to recirculate air at the tips of the fan blades 14.

The control unit 430 is configured to rotate the drums 426 between the different positions in response to preselected operating conditions. The preselected operating conditions include a plurality of preprogrammed aircraft maneuvers stored on a memory 464 included in the control unit 430. The plurality of preprogrammed aircraft maneuvers include banks, turns, rolls, etc.

The control unit 430 is configured to detect a preprogrammed aircraft maneuver included in the plurality of preprogrammed aircraft maneuvers. Once the preprogrammed aircraft maneuver is detected, the control unit 430 directs each of the drums 426 to rotate to a corresponding position in response to detecting the preprogrammed aircraft maneuver.

For example, the drums 426 may normally be in the closed position during a cruise condition so that no additional stall margin is created, but performance is not compromised. Then, when the control unit 430 detects a preprogrammed aircraft maneuver, i.e. banks, turns, rolls, the control unit 430 directs some or all of the drums 426 to rotate to the open position so that flow is permitted into the respective grooves 428', 428".

Conversely, when the control unit 430 detects the cruise condition after a preprogrammed aircraft maneuver, the control unit 430 directs the drums 426 to rotate to the closed position. Therefore, once the aircraft maneuver is completed, the drums 426 move to the closed position to performance is not compromised and the additional stall margin is removed during the cruise condition.

The control unit 430 is configured to direct some or all of the drums 426 to rotate from the closed position to the open position based on the detected preprogrammed aircraft maneuver. Depending on the preprogrammed aircraft maneuver, the control unit 430 may directly only certain drums 426 to move to the open position, while keeping others in the closed position.

Similarly, the control unit 430 is configured to receive a measurement from the at least one sensor or sensors 466 and direct the drums 426 to rotate to a corresponding position in response to the measurement. In some embodiments, the control unit 430 may be configured to use a combination of the sensor measurements and the detected preprogrammed aircraft maneuver to control the position of the plurality of drums 426.

The control unit 430 includes at least one actuator 460, a controller 462, the memory 464, and at least one sensor 466 as shown in FIGS. 16-18. The actuator 460 is coupled to drums 426. The actuator(s) 460 is configured to drive the rotating motion of the drums 426. The controller 462 is coupled to the actuator 460 to direct the actuator 460 to rotate the drums 426 between the different positions.

The actuator 460 or actuators 460 are configured to rotate the drums 426 between the closed position and the open position as shown in FIGS. 16-18. The actuator 460 or actuators 460 may also be configured to rotate the drums 426 to intermediate positions between the closed and open positions. The controller 462 is configured to direct the actuator 460 or actuators 460 to rotate the drums 426 between the different positions in response to preselected operating conditions. The preselected operating conditions include the plurality of preprogrammed aircraft maneuvers stored on the memory 464 included in the control unit 430.

The controller 462 of the control unit 430 is configured to detect a preprogrammed aircraft maneuver included in the plurality of preprogrammed aircraft maneuvers on the memory 464. Once the preprogrammed aircraft maneuver is detected, the controller 462 directs the actuator 460 to rotate some or all of the drums 426 to a corresponding position in response to detecting the preprogrammed aircraft maneuver.

The controller 462 of the control unit 430 is configured to direct the actuator(s) 60 to rotate some or all of the drums 426 from the closed position to the open position based on the detected preprogrammed aircraft maneuver. As shown in FIG. 16, the controller 62 has directed the actuator(s) 60 to rotate all of the drums 426 to the opened position. In the illustrative embodiment, the grooves 428', 428" alternative between shallow grooves 428' and deep grooves 428" when both sets of drums 426', 426" are in the open position like as shown in FIG. 16.

Depending on the preprogrammed aircraft maneuver, the controller 462 of the control unit 430 may direct certain actuators 460 to only rotate certain drums 426 to the open position, while keeping others in the closed position. As shown in FIG. 17, the controller 462 has directed the actuator(s) 460 to rotate some of the drums 426, or the first set of drums 426', to the open position, while keeping other drums 426, or a second set of drums 426", in the closed position. In this way, the shallow grooves 428' are open to the gas path 25, while the deep grooves 428" are blocked off or closed off from the gas path 25 as shown in FIG. 17.

Alternatively, the controller 462 may direct the actuator(s) 460 to rotate the second set of drums 426" to the open position, while keeping the first set of drums 426' in the closed position like as shown in FIG. 18. As shown in FIG.

18, the shallow grooves 428' are blocked off or closed off from the gas path 25, while the deep grooves 428" are open to the gas path 25.

Depending on preselected operating condition detected, the control unit 430 may change the inlet distortion mitigation system 422 to a first open mode like as shown in FIG. 17 or a second open mode like as shown in FIG. 18. In the first open mode, the drums 426' are in the open position so that the shallow grooves 428' are open to the gas path 25, while the deep grooves 428" are closed off from the gas path 25. In the second open mode, the drums 426" are in the open position so that the deep grooves 428" are open to the gas path 25, while the shallow grooves 428' are closed off from the gas path 25. Compared to the first open mode, the deeper grooves 428" of the drums 426" provide more radial flow compared to the shallow grooves 428'.

In the illustrative embodiment, the first set of drums 426' is alternated between the second set of drums 426" as shown in FIGS. 16-18. In some embodiments, the different sets 426', 426'" are arranged in series. In some embodiments, the different sets 426', 426" are arranged in groups spaced apart circumferentially. In some embodiments, the different sets 426', 426" may have drums 426 located at different circumferential locations spaced about the axis 11.

In the illustrative embodiment, the number of drums 426 in the first set of drums 426' is equal to the number of drums 426 in the second set of drums 426". In some embodiments, the number of drums 426 in one set 426', 426" may be less than or greater than the number of drums 426 in the other set 426', 426". In some embodiments, the controller 462 may not control the drums 426 in sets, but rather direct certain actuator(s) 460 to rotate certain drum(s) 426 to the open position, while keeping other drums 426 in the closed position.

In some embodiments, the control unit 430 may control the plurality of rotatable drums 426 in more than two sets. In some embodiments, the plurality of drums 426 may have more than two sets of drums. In some embodiments, may have less than two sets of drums.

The preselected operating conditions may further include a sensor input from the sensor 466 or sensors 466 included in the control unit 430. The sensor 466 is configured to measure one of pressure, air speed, and acceleration. The sensor 466 is also configured to detect distortion, fan stall, and/or other aeromechanical issues. In some embodiments, the control unit 430 includes a plurality of sensors 466 each configured to measure one of pressure, air speed, and acceleration and/or detect distortion, fan stall, and/or other aeromechanical issues.

The sensor 466 may include one of or a combination of dynamic sensors, static wall pressure sensors, altitude sensors, sensors configured to detect the angle of attack of the plurality of fan blades 14, sensors configured to detect the tip timing of the plurality of fan blades 14, and air speed sensors. In some embodiments, the sensor 466 may be a dynamic pressure transducer. The sensor 466 may also be a sensor configured to measure a rotational speed of the fan blades 14, which could be used along with an additional sensor that is a dynamic pressure transducer. In some embodiments, the sensor 466 may be a sensor configured to measure a rotation speed of another section of the engine 110.

The controller 462 of the control unit 430 is configured to receive a measurement from the sensor 466 or sensors 466 and direct the actuator 460 to rotate some or all of the drums 426 to a corresponding position in response to the measurement of the at least one sensor 466. The controller 462 of the control unit 430 may be configured to direct actuator 460 to rotate some or all of the drums 426 to the closed position when the measurements from the sensor 466 are within a predetermined threshold.

Then, when the measurement from the sensor 466 is outside of the predetermined threshold, the controller 462 directs the actuator 460 to rotate some or all of the drums 426 to the open position. For example, the controller 462 may direct the actuator 460 to rotate the first set of drums 426' to the open position, while keeping the second set of drums 426" in the closed position.

Based on the difference of the measurement from the sensor 66 compared to the predetermined threshold, the controller 62 may vary the position of the drums 26 to control the tip treatment applied to the fan blades 14 by opening/closing the groove(s) 428', 428" to the gas path 25. For example, the controller 462 may direct the actuator 460 to rotate the second set of drums 426" to the open position, while keeping the first set of drums 426' in the closed position if the measurement difference is greater and/or more radial flow is needed.

In some embodiments, the controller 462 of the control unit 430 may be configured to use a combination of the sensor measurements and the detected preprogrammed aircraft maneuver to control the position of the drums 426. In some embodiments, the controller 462 of the control unit 430 is configured to use the measurements from the sensor 646 to anticipate the aircraft maneuver.

In some embodiments, the controller 462 of the control unit 430 may detect one of the preprogrammed aircraft maneuvers, but the measurements from the sensors 466 are within the predetermined threshold. If so, the controller 462 of the control unit 430 may direct some or all of the drums 426 to remain in the current position.

Another embodiment of a fan case assembly 510 in accordance with the present disclosure is shown in FIGS. 19-25. The fan case assembly 510 is substantially similar to the fan case assembly 10 shown in FIGS. 1-9 and described herein. Accordingly, similar reference numbers in the 500 series indicate features that are common between the fan case assembly 10 and the fan case assembly 510. The description of the fan case assembly 10 is incorporated by reference to apply to the fan case assembly 510, except in instances when it conflicts with the specific description and the drawings of the fan case assembly 510.

The fan case assembly 510 includes, among other components, a case 520 and an inlet distortion mitigation system 522 as shown in FIGS. 19-25. The case 520 extends circumferentially at least partway about the axis 11 to define the outer boundary of the gas path 25 of the gas turbine engine 110. The inlet distortion mitigation system 522 includes a plurality of rotatable drums 526 disposed circumferentially in the fan case assembly 510 and a control unit 530 as shown in FIGS. 20-25. The plurality of drums 526 are rotatably coupled to the case 520 to rotate about a drum axis A. The plurality of drums 526 are configured to rotate between the closed and one of the open positions like as shown in FIGS. 20-25. The control unit 530 is configured to move the plurality of drums 526 between the different positions in response to preselected operating conditions to control fluid communication between the grooves 528', 528" and the gas path 25.

Figure 19:
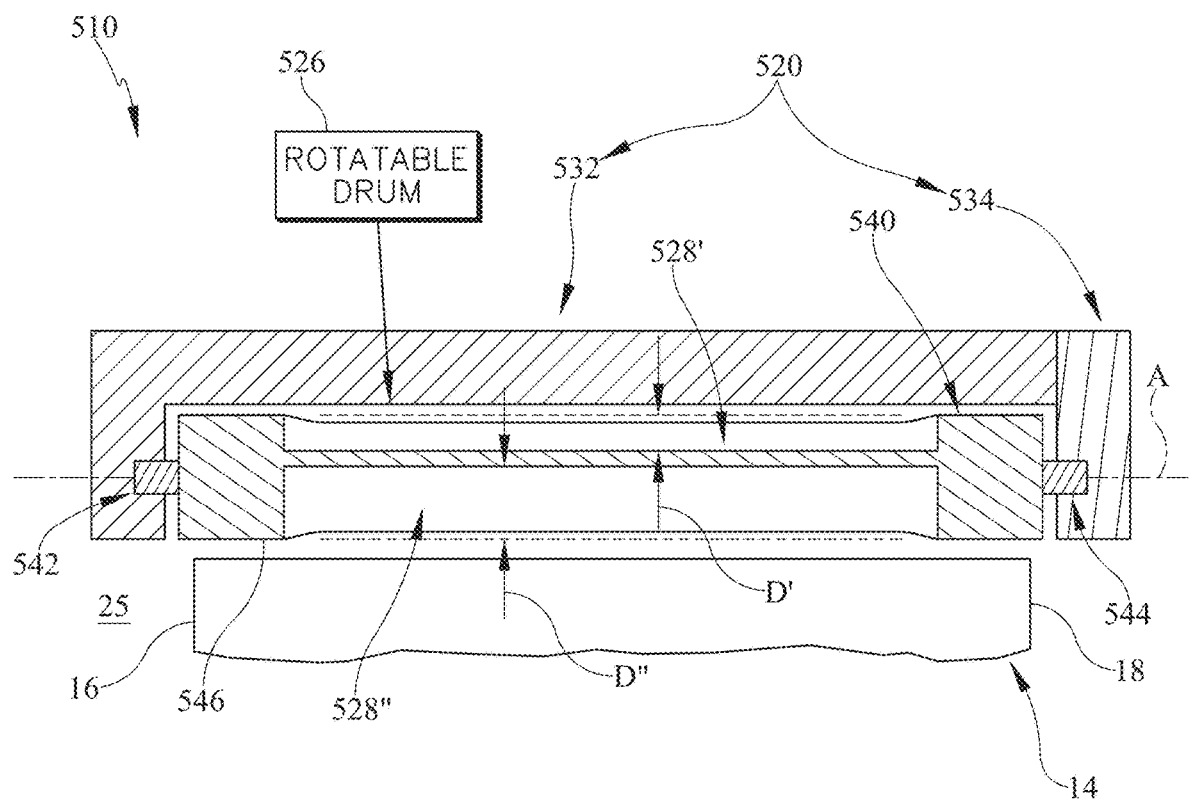
FIG. 19 is a circumferential cross-section view of another embodiment of a fan case assembly included in the gas turbine engine of FIG. 1 showing the plurality of drums include drums having both shallow and deep grooves on opposite sides of the corresponding drum.

The drums 526 may extend over and along all or a portion of the fan blades 14, for example, along the full length of the fan blades 14 as shown in FIG. 19, near the leading edge 16 of the fan blades 14 as shown in FIGS. 10 and 11, or near trailing edge 18 of the fan blades as shown in FIGS. 12 and 13. The case 520 includes a forward section 532, an aft section 534, and a partition 536 as shown in FIG. 19. The aft section 534 is configured to be coupled to the forward section 532 to trap the plurality of drums 526 axially therebetween.

Each of the drums 526 includes a drum body 540 and a pair of pegs 542, 544 as shown in FIG. 19. The drum body 540 extends between a first axial end 540A and a second axial end 540B spaced apart axially from the first axial end 540A. The drum body 540 defines an outer surface 546 that extends between the first and second axial ends 540A, 540B. The pair of pegs 542, 544 each extend from one of the axial ends 540A, 540B of the drum body 540 to the case 520 to couple the respective drum 526 to the case 520.

The drum body 540 is formed to define at least two grooves 528', 528", which include a shallow groove 528' and a deep groove 528" disposed opposite each other on opposite sides of a respective drum 526. Each of the grooves 528', 528" extends radially partway into the drum body 540 and extends axially between the first and second axial ends 540A, 540B of the drum body 540. Each of the grooves 528', 528" provides respective recess in the outer boundary of the gas path 25 when the groove 528', 528" faces toward the gas path 25 to allow air to flow in to the groove 528', 528".

The shallow groove 528'—also referred to as the first groove 528'—has a first depth D', while the deep groove 528"—also referred to as the second groove 528"—has a second depth D" as shown in FIGS. 19-25. The shallow groove 528' extends into each respective drum 526 the first depth D' and the deep groove 528" extends into each respective drum 526 a second depth D" as shown in FIGS. 19-25. The second depth D" of the deep groove 528" is greater than the first depth D' of the shallow groove 528'. The depth D' of the shallow groove 528' is smaller than or less than the depth D" of the deep groove 528" such that the deep groove 528" extends further in to the respective drum than the shallow groove 528' as shown in FIGS. 19-25.

The plurality of drums 526 may include a first set of drums 526' and a second set of drums 526". The drums 526 are rotatable between the closed position and different open positions to close/open each groove 528', 528" formed in the drums 526', 526" to the gas path 25, thereby controlling the tip treatment applied to the fan blades 14. The control unit 530 is configured to rotate the drums 526 between the different positions in response to preselected operating conditions. The control unit 530 is configured to control the position of the drums 526 similar to the control unit 30 in FIGS. 1-9.

Figure 21:
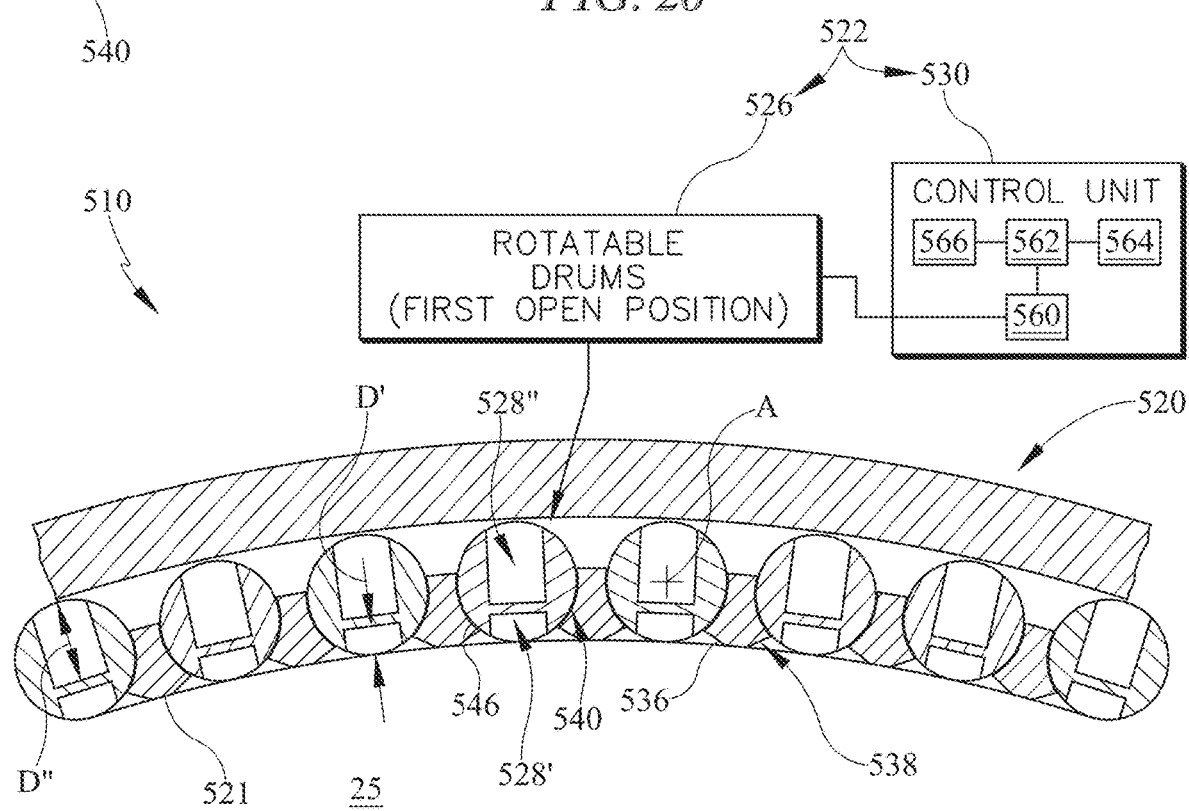
FIG. 21 is an axial cross-section view of the fan case assembly of FIG. 19 showing the plurality of drums in a first open position in which the shallow groove of the corresponding drum faces radially inwards towards the gas path while the deep groove faces radially outward away from the gas path.
Figure 22:
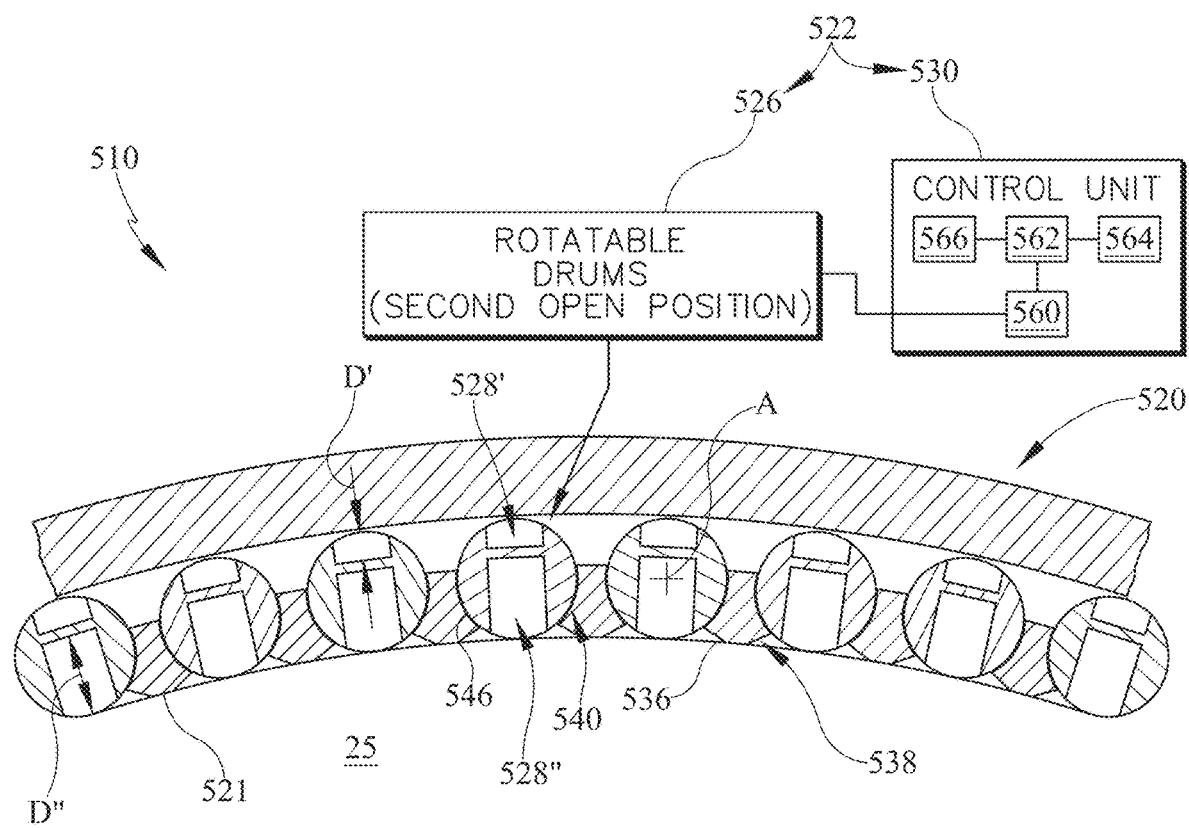
FIG. 22 is an axial cross-section view of the fan case assembly of FIG. 19 showing the plurality of drums in a second open position in which the deep groove of the corresponding drum faces radially inward towards the gas path while the shallow groove faces radially outward away from the gas path.

The plurality of drums 526 are each configured to rotate between a closed position as shown in FIG. 20 and one of the open positions as shown in FIGS. 21 and 22. Each rotatable drum 526 included in the plurality of rotatable drums 526 rotates about the drum axis A to open the corresponding groove 528', 528" towards the gas path 25. When the groove 528', 528" faces towards or is open to the gas path 25, air from the gas path 25 is allowed to flow into the groove 528', 528" to recirculate air locally at the tips of the fan blades 14. To remove tip treatment, each of the rotatable drums 526', 526" rotate to close off the groove 528', 528" from the gas path 25 so that the drums 526', 526" cooperate with the inner surface 521 of the case 520 to form the outer boundary of the gas path 25.

The control unit 530 is configured to rotate each of the plurality of drums 526 about the corresponding drum axis A between the different positions in response to preselected operating conditions to control tip treatment of the fan blades 14. The control unit 530 is configured to rotate each of the drums 526 to control whether the grooves 528', 528" in each drum 526', 526" face toward or away from the gas path 25, thereby controlling whether the grooves 528', 528" are in fluid communication with the gas path 25 to recirculate air at the tips of the fan blades 14. The control unit 530 controls the application of the tip treatment to the fan blades 14 so as to minimize the negative effects of pressure and swirl distortions in the gas turbine engine 110 to improve stall margin for the gas turbine engine 110.

In the closed position, both grooves 528', 528" of each corresponding closed drum 526 faces away from the gas path 25 so that the outer surface 546 of each drum 526 cooperates with the inner surface 521 of the case 520 to define the outer boundary of the gas path 25 as shown in FIG. 20. The outer surface 546 of each drum 526 forms a part of the outer boundary of the gas path 25 to form a uniform/consistent inner surface 521 or outer boundary of the gas path 25, i.e. no recesses or discontinuities are formed in the outer boundary of the gas path 25 such that tip treatment is removed. Fluid communication between the gas path 25 and the groove 528', 528" is blocked when the corresponding drum 526 is in the closed position.

In the different open positions, one of the grooves 528', 528" of each corresponding open drum 526 faces towards the gas path 25 so that the groove 528', 528" is open to the gas path 25 to allow air to flow into the groove 528', 528" from the gas path 25, while the other groove 528', 528" faces away from the gas path 25 as shown in FIGS. 21 and 22. In a first open position, the shallow groove 528' of the corresponding drum 526 faces radially inward towards the gas path 25 and opens to the gas path 25, while the deep groove 528" faces radially outward away from the gas path 25 as shown in FIG. 21. In a second open position, the deep groove 528" of the corresponding drum 526 faces radially inward towards the gas path 25 and opens to the gas path 25, while the shallow groove 528' faces radially outward away from the gas path 25 as shown in FIG. 22.

In the different open positions, the groove 528', 528" faces towards the gas path 25 to form recesses in the outer boundary of the gas path 25. In this way, air from the gas path 25 is allowed to flow into the recess in the outer boundary of the gas path 25 created by the groove 528', 528" to recirculate air at the tips of the fan blades 14.

The control unit 530 is configured to rotate the drums 526 between the different positions in response to preselected operating conditions. The preselected operating conditions include a plurality of preprogrammed aircraft maneuvers stored on a memory 564 included in the control unit 530. The plurality of preprogrammed aircraft maneuvers include banks, turns, rolls, etc.

The control unit 530 is configured to detect a preprogrammed aircraft maneuver included in the plurality of preprogrammed aircraft maneuvers. Once the preprogrammed aircraft maneuver is detected, the control unit 530 directs each of the drums 526 to rotate to a corresponding position in response to detecting the preprogrammed aircraft maneuver.

For example, the drums 526 may normally be in the closed position during a cruise condition so that no additional stall margin is created, but performance is not compromised. Then, when the control unit 530 detects a preprogrammed aircraft maneuver, i.e. banks, turns, rolls, the control unit 530 directs some or all of the drums 526 to rotate to one of the open positions so that flow is permitted into the respective groove 528', 528" that is open to the gas path 25.

Conversely, when the control unit 530 detects the cruise condition after a preprogrammed aircraft maneuver, the control unit 530 directs the drums 526 to rotate to the closed position. Therefore, once the aircraft maneuver is completed, the drums 526 move to the closed position to performance is not compromised and the additional stall margin is removed during the cruise condition.

The control unit 530 is configured to direct some or all of the drums 526 to rotate from the closed position to one of the open positions based on the detected preprogrammed aircraft maneuver. Depending on the preprogrammed aircraft maneuver, the control unit 530 may directly only certain drums 526 to move to one of the different open positions, while keeping others in the closed position.

Similarly, the control unit 530 is configured to receive a measurement from the at least one sensor or sensors 566 and direct the drums 526 to rotate to a corresponding position in response to the measurement. In some embodiments, the control unit 530 may be configured to use a combination of the sensor measurements and the detected preprogrammed aircraft maneuver to control the position of the plurality of drums 526.

The control unit 530 includes at least one actuator 560, a controller 562, the memory 564, and at least one sensor 566 as shown in FIGS. 20-25. The actuator 560 is coupled to drums 526. The actuator(s) 560 is configured to drive the rotating motion of the drums 526. The controller 562 is coupled to the actuator 560 to direct the actuator 560 to rotate the drums 526 between the different positions.

The actuator 560 or actuators 560 are configured to rotate the drums 526 between the closed position and the open positions as shown in FIGS. 20-25. The actuator 560 or actuators 560 may also be configured to rotate the drums 526 to intermediate positions between the closed and open positions. The controller 562 is configured to direct the actuator 560 or actuators 560 to rotate the drums 526 between the different positions in response to preselected operating conditions. The preselected operating conditions include the plurality of preprogrammed aircraft maneuvers stored on the memory 564 included in the control unit 530.

The controller 562 of the control unit 530 is configured to detect a preprogrammed aircraft maneuver included in the plurality of preprogrammed aircraft maneuvers on the memory 564. Once the preprogrammed aircraft maneuver is detected, the controller 562 directs the actuator 560 to rotate some or all of the drums 526 to a corresponding position in response to detecting the preprogrammed aircraft maneuver.

The controller 562 of the control unit 530 is configured to direct the actuator(s) 60 to rotate some or all of the drums 526 from the closed position to the open position based on the detected preprogrammed aircraft maneuver. As shown in FIG. 21, the controller 62 has directed the actuator(s) 60 to rotate all of the drums 526 to the first opened position. As shown in FIG. 22, the controller 62 has directed the actuator (s) 60 to rotate all of the drums 526 to the second opened position.

Figure 23:
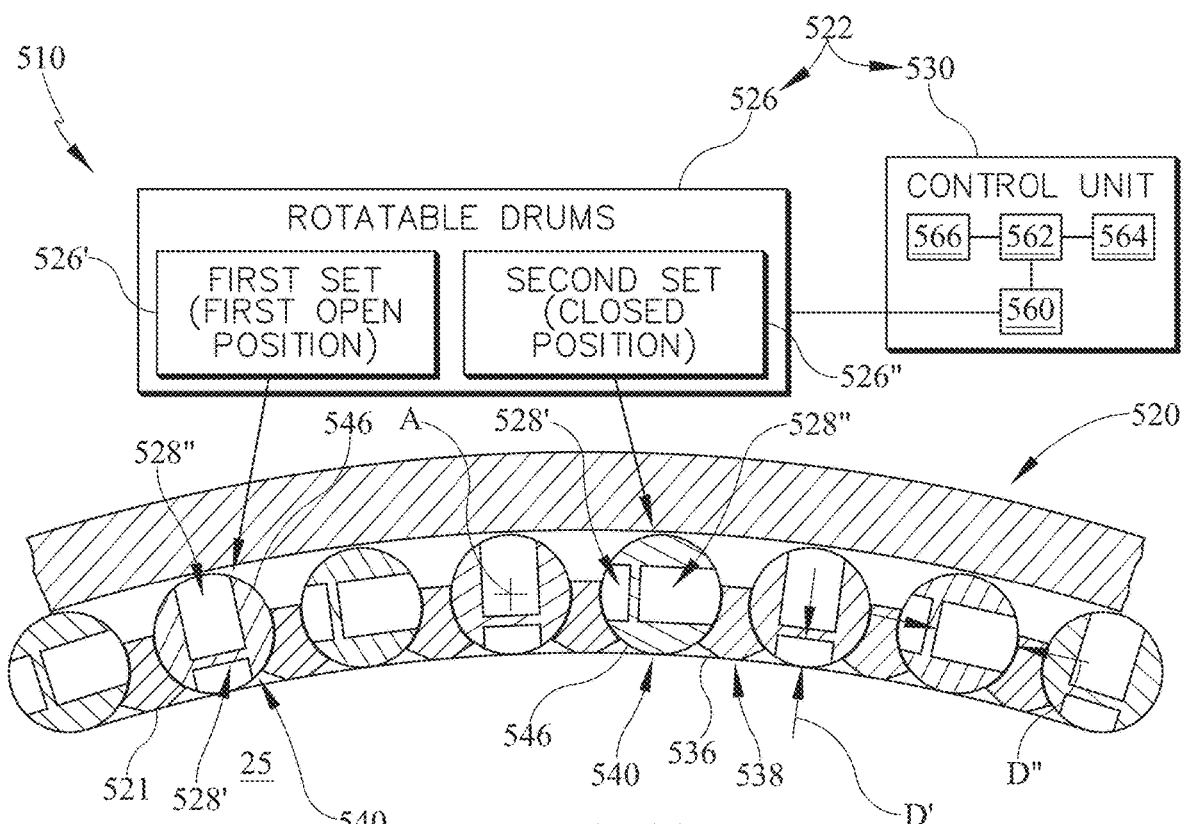
FIG. 23 is an axial cross-section view of the fan case assembly of FIG. 19 showing the plurality of drums may be rotated in different sets, the sets of drums including a first set of drums and a second set of drums alternated circumferentially between the first set of drums, and further showing the first set of drums in the first open position in which the shallow grooves face radially inward toward the gas path like as shown in FIG. 21 and the second set of drums in the closed position like as shown in FIG. 20.
Figure 24:
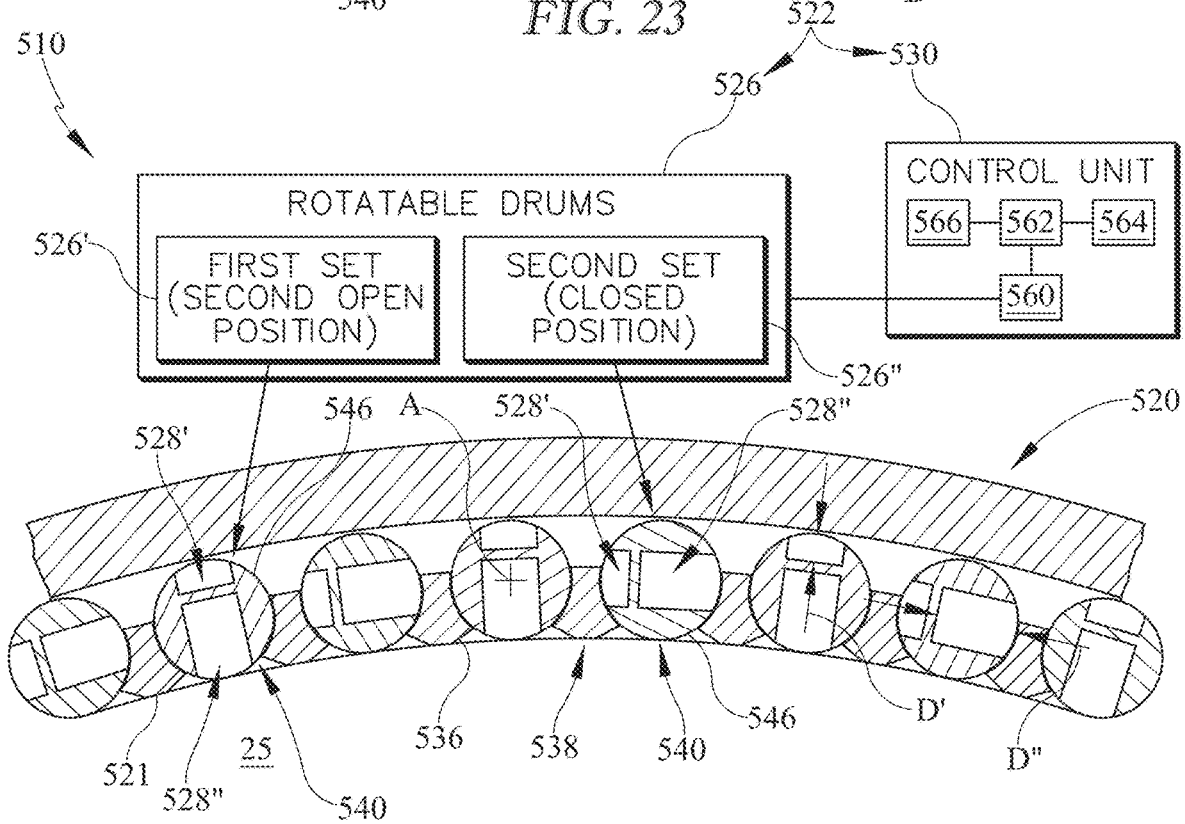
FIG. 24 is an axial cross-section view of the fan case assembly of FIG. 19 showing the first set of drums in the second open position in which the deep grooves face radially inward toward the gas path like as shown in FIG. 22 and the second set of drums remains in the closed position like as shown in FIG. 20.

Depending on the preprogrammed aircraft maneuver, the controller 562 of the control unit 530 may direct certain actuators 560 to only rotate certain drums 526 to the open position, while keeping others in the closed position. As shown in FIG. 23, the controller 562 has directed the actuator(s) 560 to rotate some of the drums 526, or the first set of drums 526', to the first open position, while keeping other drums 526, or a second set of drums 526", in the closed position. As shown in FIG. 24, the controller 562 has directed the actuator(s) 560 to rotate some of the drums 526, or the first set of drums 526', to the second open position, while keeping other drums 526, or a second set of drums 526", in the closed position. Alternatively, the controller 562 may direct the actuator(s) 560 to rotate the first set of drums 526' to the first open position and to rotate the second set of drums 526" to the second open position as shown in FIG. 25.

Figure 25:
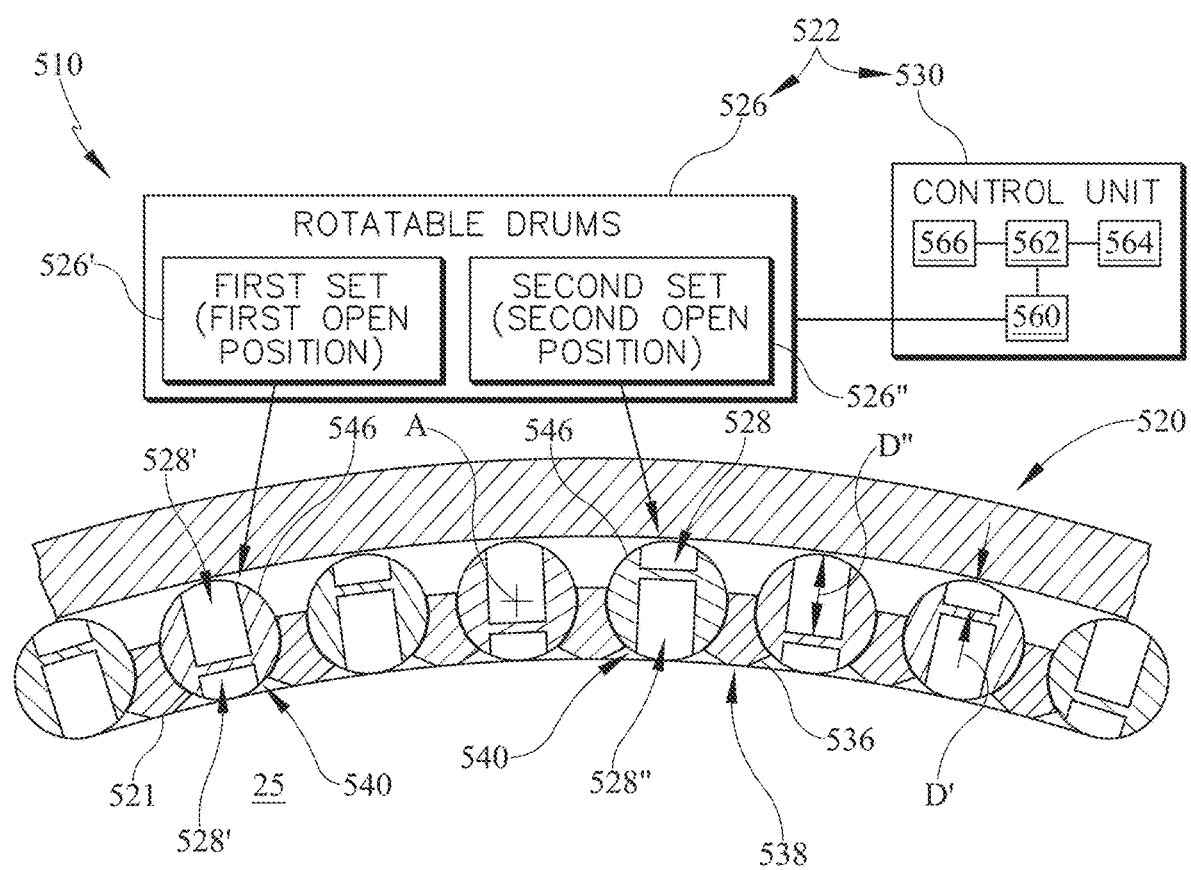
FIG. 25 is an axial cross-section view of the fan case assembly of FIG. 19 showing the first set of drums in the first open position like as shown in FIG. 21 and the second set of drums in the second open position like as shown in FIG. 22.

In the illustrative embodiment, the first set of drums 526' is alternated between the second set of drums 526" as shown in FIGS. 23-25. In some embodiments, the different sets 526', 526" are arranged in series. In some embodiments, the different sets 526', 526" are arranged in groups spaced apart circumferentially. In some embodiments, the different sets 526', 526" may have drums 526 located at different circumferential locations spaced about the axis 11.

In the illustrative embodiment, the number of drums 526 in the first set of drums 526' is equal to the number of drums 526 in the second set of drums 526". In some embodiments, the number of drums 526 in one set 526', 526" may be less than or greater than the number of drums 526 in the other set 526', 526". In some embodiments, the controller 562 may not control the drums 526 in sets, but rather direct certain actuator(s) 560 to rotate certain drum(s) 526 to the open position, while keeping other drums 526 in the closed position.

In some embodiments, the control unit 530 may control the plurality of rotatable drums 526 in more than two sets. In some embodiments, the plurality of drums 526 may have more than two sets of drums. In some embodiments, may have less than two sets of drums.

The preselected operating conditions may further include a sensor input from the sensor 566 or sensors 566 included in the control unit 530. The sensor 566 is configured to measure one of pressure, air speed, and acceleration. The sensor 566 is also configured to detect distortion, fan stall, and/or other aeromechanical issues. In some embodiments, the control unit 530 includes a plurality of sensors 566 each configured to measure one of pressure, air speed, and acceleration and/or detect distortion, fan stall, and/or other aeromechanical issues.

The sensor 566 may include one of or a combination of dynamic sensors, static wall pressure sensors, altitude sensors, sensors configured to detect the angle of attack of the plurality of fan blades 14, sensors configured to detect the tip timing of the plurality of fan blades 14, and air speed sensors. In some embodiments, the sensor 566 may be a dynamic pressure transducer. The sensor 566 may also be a sensor configured to measure a rotational speed of the fan blades 14, which could be used along with an additional sensor that is a dynamic pressure transducer. In some embodiments, the sensor 566 may be a sensor configured to measure a rotation speed of another section of the engine 110.

The controller 562 of the control unit 530 is configured to receive a measurement from the sensor 566 or sensors 566 and direct the actuator 560 to rotate some or all of the drums 526 to a corresponding position in response to the measurement of the at least one sensor 566. The controller 562 of the control unit 530 may be configured to direct actuator 560 to rotate some or all of the drums 526 to the closed position when the measurements from the sensor 566 are within a predetermined threshold.

Then, when the measurement from the sensor 566 is outside of the predetermined threshold, the controller 562 directs the actuator 560 to rotate some or all of the drums 526 to one of the different open positions. For example, the controller 562 may direct the actuator 560 to rotate the all of the drums 526 to one of the open positions. Additionally, the controller 562 may direct the actuator 560 to rotate the first set of drums 526' to the one of the open positions, while keeping the second set of drums 526" in the closed position or the controller 562 may direct the actuator 560 to rotate the second set of drums 526" to one of the open positions, while keeping the first set of drums 526' in the closed position. In some embodiments, the controller 562 may direct the actuator 560 to alternate the open positions of the drums 526', 526" like as shown in FIG. 25.

Based on the difference of the measurement from the sensor 66 compared to the predetermined threshold, the controller 62 may vary the position of the drums 26 to control the tip treatment applied to the fan blades 14 by opening/closing the groove(s) 528', 528" to the gas path 25. For example, the controller 562 may direct the actuator 560 to rotate the first set of drums 526' to one of the open positions, while keeping the second set of drums 526" in the closed position if the measurement difference is greater and/or more radial flow is needed. Additionally, the controller 562 may direct the actuator 560 to rotate the second set of drums 526" to one of the open positions, while keeping the first set of drums 526' in the closed position if the measurement difference is greater and/or more radial flow is needed.

In some embodiments, the controller 562 of the control unit 530 may be configured to use a combination of the sensor measurements and the detected preprogrammed aircraft maneuver to control the position of the drums 526. In some embodiments, the controller 562 of the control unit 530 is configured to use the measurements from the sensor 646 to anticipate the aircraft maneuver.

In some embodiments, the controller 562 of the control unit 530 may detect one of the preprogrammed aircraft maneuvers, but the measurements from the sensors 566 are within the predetermined threshold. If so, the controller 562 of the control unit 530 may direct some or all of the drums 526 to remain in the current position.

The fan 112 includes an inlet distortion mitigation system 22, 222, 322, 422, 522 which includes a plurality of rotatable drums 26, 226, 326, 426, 526 configured to control fluid communication between the grooves 28, 228, 328, 428, 528 and the gas path 25. The plurality of rotatable drums 26, 226, 326, 426, 526 may be rotated all together or in sets/groups to expose the tips of the fan blades 14 to the grooves 28, 228, 328, 428', 428", 528', 528".

The flow path or gas path 25 between the drums 26, 226, 326, 426, 526 is a static flow path or has partitions 38 so when the grooves 28, 228, 328, 428, 528 are rotated away from the gas path 25, the gas path 25 is relatively smooth. Then the drums 26, 226, 326, 426, 526 may be rotated to expose the grooves 28, 228, 328, 428, 528 to the gas path 25 and direct flow into the grooves 28, 228, 328, 428, 528.

In the illustrative embodiment, the partitions 38 may block part of the groove 28 in certain positions to vary the size of the opening to the groove 28 thereby modulating the flow therethrough. For example, if the grooves 28 are angled so that the groove 28 extends radially and circumferentially, the partition 38 may partially block the groove 28. In some embodiments, the partitions 38 do not block the opening to the groove 28 such that in the open position the grooves 28 are completely open to the gas path 25.

The rotating drums 26, 226, 326, 426, 526 may be incorporated into the fan case 20, 220, 320, 420, 520 or into liners and operated via a variable geometry system similar to variable vanes. The actuator(s) 60 may be similar to the variable geometry system used with variable vanes.

In the first condition, or the closed position, the grooves 28, 228, 328, 428', 428", 528', 528" would be closed so no additional stall margin is created, but performance is not compromised. In a second condition, or one of the open positions, the plurality of drums 26, 226, 326, 426, 526 rotates to permit flows into the grooves 28, 228, 328, 428', 428", 528', 528" to provide tip treatment benefits to the fan blades 14. The angle of the grooves 28, 228, 328, 428', 428", 528', 528" of the drums 26, 226, 326, 426, 526 may be adjusted to tune the arrangement to particular needs or conditions.

The plurality of drums 26, 226, 326, 426, 526 permit the fan 112 to optimize efficiency at a cruise point with limited distortion, while being able to maintain adequate stall margin at another condition. By activating the rotatable drums 26, 226, 326, 426, 526 to trade efficiency for stall margin improvement, but not have to live with that trade at all times, the inlet distortion mitigation system 22, 222, 322, 422, 522 allows optimization of the fan 112.

The drums 26, 226, 326, 424, 524 rotate to open or close the flow of air into the grooves 28, 228, 328, 428', 428", 528', 528". The grooves 28, 228, 328, 428', 428", 528', 528" of the respective drums 26, 226, 326, 426, 526 may be rotated to a range of angles between 0 to about 90 degrees. This may be done with all drums 26, 226, 326, 426, 526 controlled the same, or with different angles for different sectors via ganging.

The control unit 30, 230, 330, 430, 530 is configured to use sensor inputs from a sensor 66, 466, 566 to control operation of the drums 26, 226, 326, 426, 526. The sensor 66, 466, 566 may include one of or a combination of a static wall pressure sensor, an altitude sensor, sensors configured to detect twisting of the fan blades 14, sensors configured to detect the tip timing of the fan blades 14, sensors configured to measure a rotational speed of the fan blades 14, a dynamic pressure transducer sensor. The combination of some sensors may provide data to engage mitigation of the effects of distortion, while other sensors may detect the maneuvers or mission phase.

For example, altitude and fan speed may provide data to engage mitigation, while also providing maneuver detection or regime/mission phase framing of control logic. Additionally, static wall pressure, dynamic pressure transducers, blade tip timing, blade untwist as well as fan speed and altitude may be used in distortion/effect detection for the control logic.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A fan case assembly adapted for use with a gas turbine engine, the fan case assembly comprising
  a case that extends circumferentially at least partway about a central axis of the fan case assembly to define an outer boundary of a gas path of the gas turbine engine, the case formed to define a channel that extends circumferentially at least partway about the central axis,
  a plurality of drums arranged in the channel and spaced circumferentially about the central axis, each drum of the plurality of drums shaped to include at least one groove that extends partway into the drum, each drum of the plurality of drums is configured to rotate about a respective drum axis between a closed position in which the groove of the corresponding drum faces away from the gas path so that an outer surface of the corresponding drum cooperates with an inner surface of the case to define the outer boundary of the gas path and an open position in which the at least one groove of the corresponding drum faces towards the gas path so that the at least one groove of the corresponding drum is open to the gas path to allow air to flow into the at least one groove from the gas path, and a control unit configured to rotate the plurality of drums about the respective drum axis between the closed position and the open position in response to preselected operating conditions to minimize negative effects pressure and swirl distortions in the gas turbine engine to improve stall margin.

2. The fan case assembly of claim 1, wherein the plurality of drums includes a first set of drums and a second set of drums and the control unit is configured to rotate the first set of drums between the closed position and the open position independent of the second set of drums.

3. The fan case assembly of claim 2, wherein the first set of drums are alternated circumferentially between the second set of drums.

4. The fan case assembly of claim 2, wherein the groove on each respective drum of the first set of drums has a first depth and the groove on each respective drum of the second set of drums has a second depth, wherein the first depth is greater than the second depth.

5. The fan case assembly of claim 1, wherein each drum of the plurality of drums is shaped to include a first groove that extends partway into the respective drum and a second groove that extends partway into the respective drum opposite the first groove, and wherein each drum of the plurality of drums is configured to rotate about the respective drum axis between the closed position in which the first groove and the second groove of the corresponding drum each face away from the gas path so that the outer surface of the corresponding drum cooperates with the inner surface of the case to define the outer boundary of the gas path, a first open position in which the first groove of the corresponding drum faces radially inward towards the gas path and opens to the gas path while the second groove faces radially outward away from the gas path, and a second open position in which the second groove of the corresponding drum faces radially inward towards the gas path and opens to the gas path while the first groove faces radially outward away from the gas path.

6. The fan case assembly of claim 5, wherein a depth of the first groove is greater than a depth of the second groove.

7. The fan case assembly of claim 1, wherein each drum of the plurality of drums has a cylindrical shape that defines a first end, a second end spaced apart axially from the first end, and the outer surface that extends axially between the first end and the second end and circumferentially about the corresponding drum axis.

8. The fan case assembly of claim 1, wherein the control unit includes at least one actuator coupled to the plurality of drums and configured to drive rotation of the plurality of drums between the closed position and the open position and a controller coupled to the at least one actuator and configured to direct the at least one actuator to move the plurality of drums to the closed position when the gas turbine engine is in a cruise condition included in the preselected operating conditions.

9. The fan case assembly of claim 8, wherein the control unit further includes a memory coupled to the controller, the memory including a plurality of preprogrammed aircraft maneuvers that each correspond to one of the closed position and the open position, and wherein the controller is configured to detect a preprogrammed aircraft maneuver included in the plurality of preprogrammed aircraft maneuvers on the memory and direct the at least one actuator to move the plurality of drums to a corresponding position in response to detecting the preprogrammed aircraft maneuver.

10. The fan case assembly of claim 8, wherein the control unit further includes at least one sensor coupled to the controller and configured to measure one of pressure, air speed, altitude, blade tip timing, blade rotational speed, attitude, and acceleration, and wherein the controller is configured to receive a measurement from the at least one sensor and direct the at least one actuator to move the plurality of drums to a corresponding position in response to the measurement of the at least one sensor.

11. A gas turbine engine comprising
a fan including a fan rotor configured to rotate about an axis of the gas turbine engine and a plurality of fan blades coupled to the fan rotor for rotation therewith and
a fan case assembly adapted for use with a gas turbine engine, the fan case assembly comprising
a case that extends circumferentially at least partway about a central axis of the fan case assembly to define an outer boundary of a gas path of the gas turbine engine, the case formed to define a channel that extends circumferentially at least partway about the central axis,
a plurality of drums arranged in the channel, each drum of the plurality of drums shaped to include at least one groove that extends partway into the drum, each drum of the plurality of drums is configured to rotate about a respective drum axis between a closed position in which the groove of the corresponding drum faces away from the gas path and an open position in which the groove of the corresponding drum faces towards the gas path so that the at least one groove is open to the gas path, and
a control unit configured to rotate the plurality of drums about the respective drum axis between the closed position and the open position in response to preselected operating conditions.

12. The fan case assembly of claim 11, where each of the plurality of fan blades includes a leading edge and a trailing edge, and wherein the plurality of drums are located closer to one of the leading edge and the trailing edge of the plurality of fan blades.

13. The fan case assembly of claim 11, wherein each drum of the plurality of drums has a cylindrical shape that defines a first end, a second end spaced apart axially from the first end, and an outer surface that extends axially between the first end and the second end and circumferentially about the corresponding drum axis, and wherein the outer surface of each drum of the plurality of drums cooperates with an inner surface of the gas path to define a portion of the outer boundary of the gas path when each drum of the plurality of drums is in the closed position.

14. The gas turbine engine of claim 13, wherein the plurality of drums includes a first set of drums and a second set of drums and the control unit is configured to rotate the first set of drums between the closed position and the open position independent of the second set of drums.

15. The gas turbine engine of claim 14, wherein the first set of drums are alternated circumferentially between the second set of drums.

16. The fan case assembly of claim 15, wherein the groove on each respective drum of the first set of drums has a first depth and the groove on each respective drum of the second set of drums has a second depth, wherein the first depth is greater than the second depth.

17. The fan case assembly of claim 11, wherein each drum of the plurality of drums has a first groove that extends partway into the respective drum and a second groove that extends partway into the respective drum opposite the first groove, wherein each drum of the plurality of drums is configured to rotate about the respective drum axis between the closed position in which the first groove and the second groove of the corresponding drum each face away from the gas path so that an outer surface of the corresponding drum cooperates with an inner surface of the case to define the outer boundary of the gas path, a first open position in which the first groove of the corresponding drum faces radially inward towards the gas path while the second groove faces radially outward away from the gas path, and a second open position in which the second groove of the corresponding drum faces radially inward towards the gas path while the first groove faces radially outward away from the gas path, and wherein the depth of the first groove is larger than a depth of the second groove.

18. The gas turbine engine of claim 11, wherein the control unit includes at least one actuator coupled to the plurality of drums and configured to drive movement of the plurality of drums between the closed position and the open position and a controller coupled to the at least one actuator and configured to direct the at least one actuator to move the plurality of drums to the closed position when the gas turbine engine is in a cruise condition included in the preselected operating conditions.

19. The gas turbine engine of claim 18, wherein the control unit further includes a memory coupled to the controller, the memory including a plurality of preprogrammed aircraft maneuvers that each correspond to one of the closed position and the open position, and wherein the controller is configured to detect a preprogrammed aircraft maneuver included in the plurality of preprogrammed aircraft maneuvers on the memory and direct the at least one actuator to move the plurality of drums to a corresponding position in response to detecting the preprogrammed aircraft maneuver.

20. A method comprising
providing a fan case assembly adapted for use with a gas turbine engine, the fan case assembly including a case that extends circumferentially at least partway about a central axis of the gas turbine engine and formed to define an outer boundary of a gas path of the gas turbine engine, the case formed to define a channel that extends circumferentially at least partway about the central axis, and a plurality of drums arranged in the channel, each one of the plurality of drums including at least one groove that extends partway into the drum, each drum of the plurality of drums configured to rotate about a respective drum axis,
locating the plurality of drums in a closed position in which the at least one groove of the corresponding drum faces away from the gas path to cause the outer surface of the corresponding drum to cooperate with an inner surface of the case to define the outer boundary of the gas path, and
rotating the plurality of drums to an open position in which the at least one groove the corresponding drum faces toward the gas path so that the at least one groove is open to the gas path to allow air to flow into the at least one groove from the gas path.

* * * * *